(12) United States Patent
Moon

(10) Patent No.: US 11,860,465 B2
(45) Date of Patent: Jan. 2, 2024

(54) INPUT SENSING PANEL AND DISPLAY DEVICE HAVING THE SAME

(71) Applicant: Samsung Display Co., Ltd., Yongin-Si (KR)

(72) Inventor: Changyun Moon, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 7 days.

(21) Appl. No.: 17/519,448

(22) Filed: Nov. 4, 2021

(65) Prior Publication Data

US 2022/0260873 A1  Aug. 18, 2022

(30) Foreign Application Priority Data

Feb. 15, 2021  (KR) ........................ 10-2021-0020107

(51) Int. Cl.
*G02F 1/1335* (2006.01)
*G09G 3/36* (2006.01)
*G02B 26/08* (2006.01)

(52) U.S. Cl.
CPC ... *G02F 1/133512* (2013.01); *G02B 26/0858* (2013.01); *G02B 26/0875* (2013.01); *G02F 1/133514* (2013.01); *G09G 3/3648* (2013.01); *G09G 3/3674* (2013.01); *G09G 2300/0408* (2013.01)

(58) Field of Classification Search
CPC ......... G02F 1/133512; G02F 1/133514; G02B 26/0858; G02B 26/0875; G09G 3/3648; G09G 3/3674; G09G 2300/0408

USPC .......................................................... 349/110
See application file for complete search history.

(56) References Cited

U.S. PATENT DOCUMENTS

| 8,493,530 B2 | 7/2013 | Yoon et al. |
| 10,802,268 B2 | 10/2020 | Lee |
| 2010/0123671 A1* | 5/2010 | Lee ...................... G06F 3/0412 29/25.35 |
| 2015/0371573 A1 | 12/2015 | Choi et al. |

FOREIGN PATENT DOCUMENTS

| GB | 2580700 A | * | 7/2020 | ........... G06F 3/0412 |
| KR | 10-1330749 B1 | | 11/2013 | |
| KR | 10-2016-0000096 A | | 1/2016 | |
| KR | 10-2019-0011372 A | | 2/2019 | |

* cited by examiner

*Primary Examiner* — Edward J Glick
*Assistant Examiner* — William D Peterson
(74) *Attorney, Agent, or Firm* — Innovation Counsel LLP

(57) ABSTRACT

A display device comprises a display panel including a pixel providing a light and an input sensing panel sensing an external input. The input sensing panel includes a first sensing insulating layer disposed on the display panel, first conductive patterns disposed on the first sensing insulating layer, a second sensing insulating layer covering the first conductive patterns, second conductive patterns disposed on the second sensing insulating layer, a piezoelectric pattern covering the second conductive patterns, a light blocking pattern covering the piezoelectric pattern and defining a transmission opening transmitting the light, and a third sensing insulating layer covering the light blocking pattern.

20 Claims, 13 Drawing Sheets

INPUT SENSING PANEL AND DISPLAY DEVICE HAVING THE SAME

CROSS-REFERENCE TO RELATED APPLICATION

This U.S. non-provisional patent application claims priority under 35 U.S.C. § 119 of Korean Patent Application No. 10-2021-0020107, filed on Feb. 15, 2021, the contents of which are hereby incorporated by reference in its entirety.

BACKGROUND

1. Field of Disclosure

The present disclosure relates to a display device, and more particularly to a display device including an input sensing panel, which is capable of adjusting a size of a light emitting area thereof.

2. Description of the Related Art

A display device includes a display panel that displays an image and an input sensing panel that senses an external input. The input sensing panel is integrally formed with the display panel through successive processes. As another way, the input sensing panel is coupled to the display panel after being manufactured through a separate process from that of the display panel.

SUMMARY

The present disclosure provides a display device capable of improving a privacy protection function according to the needs of the user by adjusting a size of a light emitting area to reduce a viewing angle.

Embodiments of the present disclosure provide a display device including a display panel including a pixel providing a light, and an input sensing panel configured to sense an external input. The input sensing panel includes a first sensing insulating layer disposed on the display panel, a plurality of first conductive patterns disposed on the first sensing insulating layer, a second sensing insulating layer disposed on the first sensing insulating layer to cover the first conductive patterns, a plurality of second conductive patterns disposed on the second sensing insulating layer, a piezoelectric pattern covering the second conductive patterns, a light blocking pattern covering the piezoelectric pattern and defining a transmission opening configured to transmit light, and a third sensing insulating layer disposed on the second sensing insulating layer to cover the light blocking pattern.

The transmission opening has a first width in one direction in a first mode and has a second width smaller than the first width in the one direction in a second mode in which a voltage different from a voltage of the first mode is applied.

The display panel includes a base layer, a circuit element layer including a transistor disposed on the base layer, a display element layer including a first electrode connected to the transistor, a second electrode disposed on the first electrode, a light emitting layer disposed between the first electrode and the second electrode, and a pixel definition layer through which a display opening is defined to expose at least a portion of the first electrode, and an encapsulation layer covering the display element layer, and the first sensing insulating layer is disposed on the encapsulation layer and in direct with the encapsulation layer.

The piezoelectric pattern has larger volume in the second mode than in the first mode.

The light blocking pattern includes a side surface defining a boundary of a light emitting area, and wherein the light emitting area has smaller size in the second mode than in the first mode.

The light blocking pattern is protruded to a direction toward the light emitting area when the first mode is changed to the second mode, and a width of the protruded portion of the light blocking pattern is within a range equal to or greater than about 2 micrometers and equal to or smaller than about 5 micrometers when the first mode is changed to the second mode.

The light blocking pattern includes a light absorbing material.

The display device further includes a color filter layer disposed on the input sensing panel and overlapping the light emitting area and a window disposed on the color filter layer.

The input sensing panel further includes a cover layer disposed on the third sensing insulating layer, the third sensing insulating layer defines a cover opening exposing at least a portion of the second sensing insulating layer and overlapping at least a portion of the light emitting area, and the cover layer is in contact with the second sensing insulating layer in an area overlapping the cover opening.

The second conductive patterns include a plurality of mesh lines.

Embodiments of the present disclosure provide a display device including a display panel including a pixel providing a light and an input sensing panel sensing an external input. The input sensing panel includes a plurality of sensing insulating layers, a plurality of conductive patterns disposed between the sensing insulating layers, a piezoelectric pattern covering at least a portion of the conductive patterns, and a light blocking pattern covering the piezoelectric pattern and defining a transmission opening transmitting the light. The transmission opening has a first width in one direction in a first mode and has a second width smaller than the first width in the one direction in a second mode in which a voltage different from a voltage of the first mode is applied.

The display panel includes a base layer, a circuit element layer including a transistor disposed on the base layer, a display element layer including a first electrode connected to the transistor, a second electrode disposed on the first electrode, a light emitting layer disposed between the first electrode and the second electrode, and a pixel definition layer through which a display opening is defined to expose at least a portion of the first electrode, and an encapsulation layer covering the display element layer, and a sensing insulating layer disposed nearest to the display panel among the sensing insulating layers is disposed on the encapsulation layer and in direct contact with the encapsulation layer.

The piezoelectric pattern has larger volume in the second mode than in the first mode.

The light blocking pattern includes a side surface defining a boundary of a light emitting area, and wherein the light emitting area has smaller size in the second mode than a size in the first mode.

The light blocking pattern is protruded to a direction toward the light emitting area when the first mode is changed to the second mode, and a width of the protruded portion of the light blocking pattern is within a range equal to or greater than about 2 micrometers and equal to or smaller than about 5 micrometers when the first mode is changed to the second mode.

The display device further includes a color filter layer disposed on the input sensing panel and overlapping the light emitting area and a window disposed on the color filter layer.

The input sensing panel further includes a cover layer covering at least a portion of the sensing insulating layers, and a sensing insulating layer disposed at an uppermost position among the sensing insulating layers has a trapezoidal shape in a cross-section and defines a cover opening overlapping at least a portion of the light emitting area.

Embodiments of the present disclosure provide an input sensing panel including a first sensing insulating layer, a plurality of first conductive patterns disposed on the first sensing insulating layer, a second sensing insulating layer disposed on the first sensing insulating layer to cover the first conductive patterns, a plurality of second conductive patterns disposed on the second sensing insulating layer, a piezoelectric pattern covering the second conductive patterns, a light blocking pattern covering the piezoelectric pattern and defining a transmission opening through which at least a portion of the second sensing insulating layer is exposed, and a third sensing insulating layer disposed on the second sensing insulating layer to cover the light blocking pattern.

The transmission opening has a first width in one direction in a first mode and has a second width smaller than the first width in the one direction in a second mode in which a voltage different from a voltage of the first mode is applied.

The piezoelectric pattern has a changeable volume that is changed when the first mode is changed to the second mode.

According to the above, the volume of each of the piezoelectric pattern and the light blocking pattern, which are included in the input sensing panel, is varied, and this leads to an increase or decrease of a viewing angle of the display device. As the viewing angle viewed from the side surface by a third-party is able to be blocked by decreasing the viewing angle as needed, a privacy protection function of the display device is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1A:
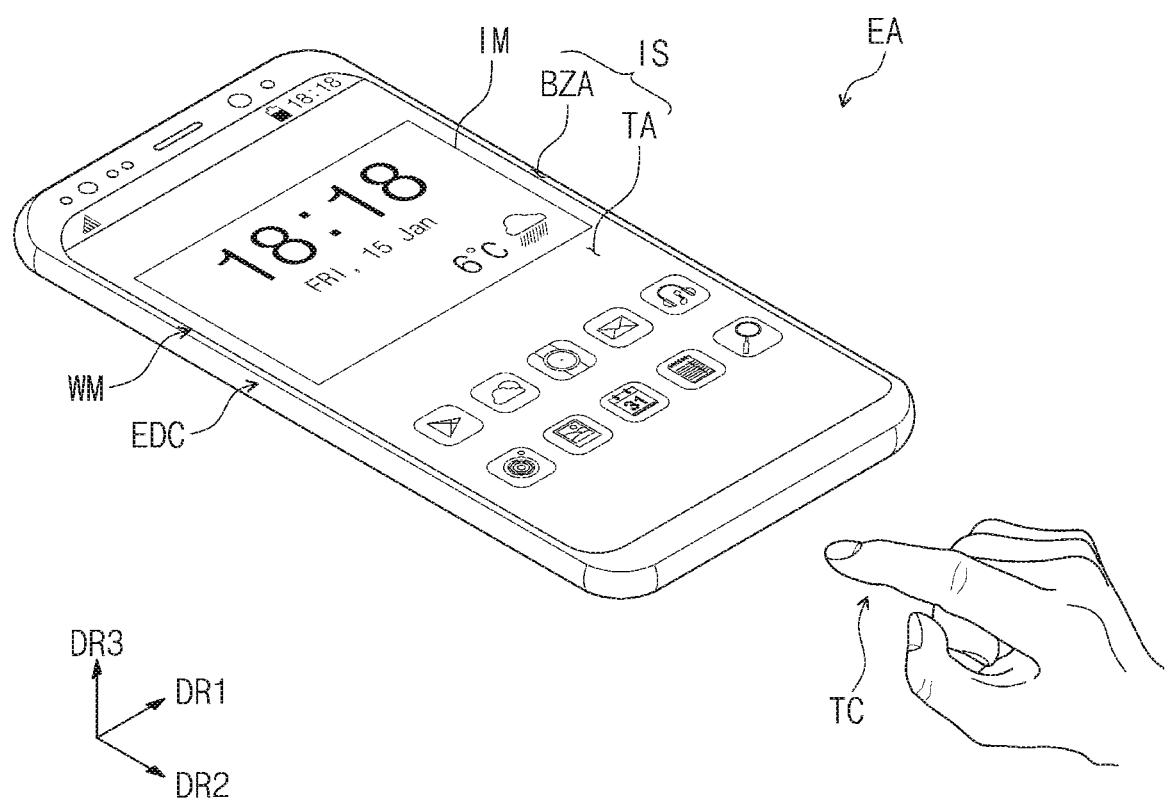
FIG. 1A is a perspective assembled view showing a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Hereinafter, the present disclosure will be explained in detail with reference to the accompanying drawings.

Figure 1B:
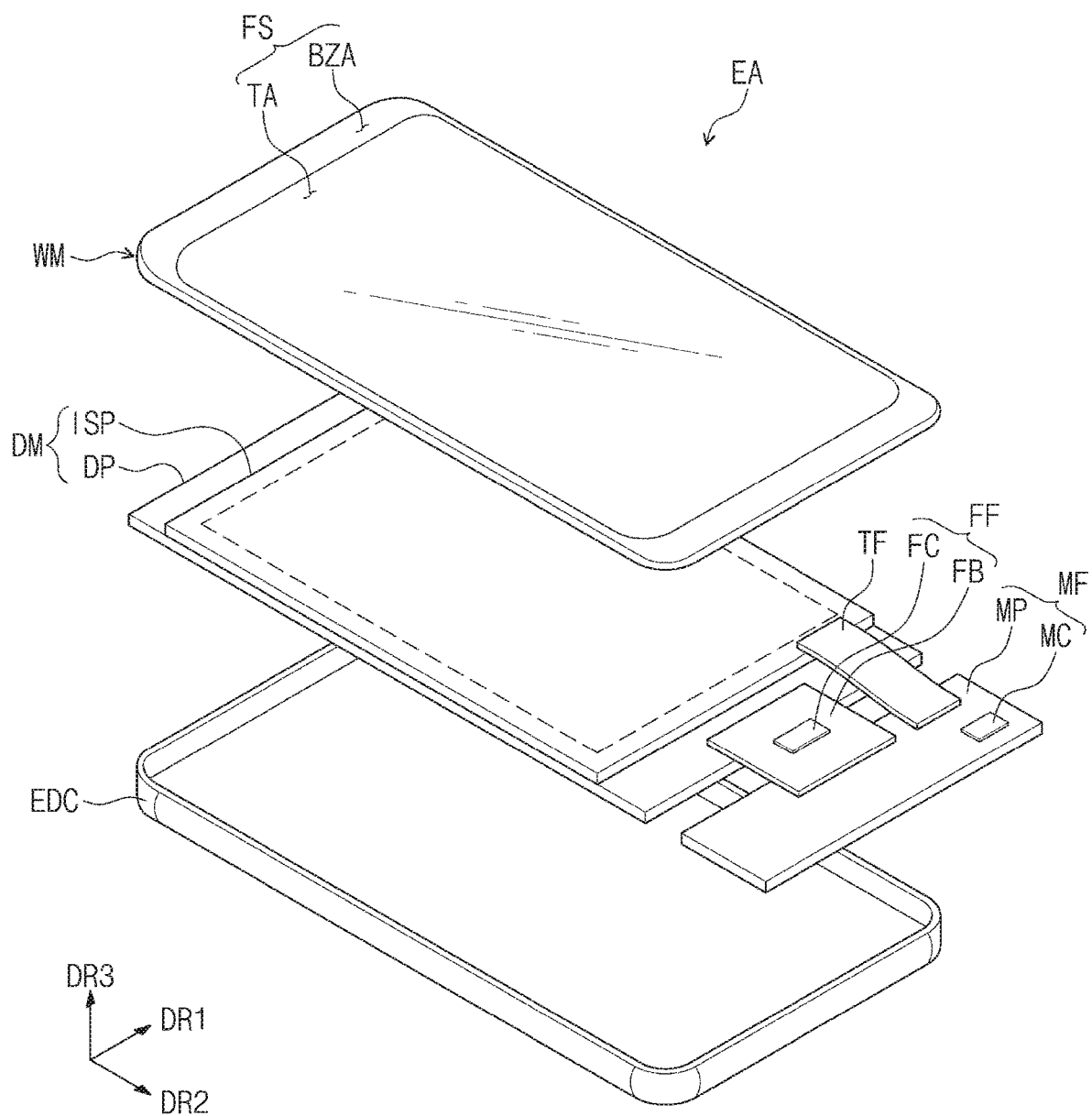
FIG. 1B is an exploded perspective view showing a display device according to an embodiment of the present disclosure.

FIG. 1A is a perspective assembled view showing a display device EA according to an embodiment of the present disclosure, and FIG. 1B is an exploded perspective view showing the display device EA according to an embodiment of the present disclosure.

Referring to FIGS. 1A and 1B, the display device EA may be a device that is activated in response to electrical signals. The display device EA may include various embodiments. For example, the display device EA may be applied to a tablet computer, a notebook computer, a computer, a smart television, or the like. In the present embodiment, a smartphone will be described as a representative example of the display device EA.

The display device EA may display an image IM through a display surface IS, which is substantially parallel to each of a first direction DR1 and a second direction DR2, toward a third direction DR3. The display surface IS through which the image IM is displayed may correspond to a front surface of the display device EA. The image IM may include a video and a still image. FIG. 1A shows a clock widget and application icons as a representative example of the image IM.

In the present embodiment, front (or upper) and rear (or lower) surfaces of each member of the display device EA may be defined with respect to a direction in which the image IM is displayed. The front and rear surfaces may be opposite to each other in the third direction DR3, and a normal line direction of each of the front and rear surfaces may be substantially parallel to the third direction DR3.

A separation distance in the third direction DR3 between the front surface and a rear surface of the display device EA may correspond to a thickness/height in the third direction DR3 of the display device EA. Meanwhile, directions indicated by the first, second, and third directions DR1, DR2, and DR3 are relative to each other, and thus, the directions indicated by the first, second, and third directions DR1, DR2, and DR3 may be changed to other directions.

The front surface of the display device EA may be divided into a transmission area TA and a bezel area BZA. The image IM may be displayed through the transmission area TA. The user may view the image IM through the transmission area TA. In the present embodiment, the transmission area TA may have a quadrangular shape with rounded vertices. However, this is merely one example, and the transmission area TA may have a variety of shapes and should not be particularly limited.

The bezel area BZA may be disposed adjacent to the transmission area TA. The bezel area BZA may have a predetermined color. The bezel area BZA may surround the transmission area TA. Accordingly, the shape of the transmission area TA may be defined by the bezel area BZA, however, this is merely one example. According to an embodiment, the bezel area BZA may be disposed adjacent to only one side of the transmission area TA or may be omitted. The display device EA may be implemented in various embodiments, and it should not be particularly limited.

The display device EA may sense an external input TC applied thereto from an outside. The external input TC may include a variety of external inputs provided from the outside of the display device EA. For example, the external input TC may include an external input (e.g., a hovering input) in proximity to or approaching close to the display device EA at a predetermined distance as well as a touch input by a user's body, e.g., a hand of a user. In addition, the external input TC may include various forms, such as force, pressure, or light, however, it should not be limited thereto or thereby. FIG. 1A shows the hand of the user as a representative example of the external input TC.

Referring to FIG. 1B, the display device EA may include a window member WM, an external case EDC, a display module DM, a main circuit board MF, and flexible circuit boards FF and TF. The display module DM may include a display panel DP and an input sensing panel ISP.

The window member WM may be disposed on the display module DM. The window member WM may prevent external impacts from being applied to the display module DM and may prevent foreign substances from entering the display module DM to protect the display module DM.

The window member WM may include a transparent material through which an image transmits. For example, the window member WM may include glass, sapphire, or plastic. The window member WM is shown as a single layer, however, it should not be limited thereto or thereby. The window member WM may include plural layers. Meanwhile, although not shown in figures, the bezel area BZA of the display device EA may be obtained by printing a material having the predetermined color on an area of the window member WM.

The external case EDC may accommodate the display module DM. The external case EDC may be coupled to the window member WM to define an exterior of the display device EA. The external case EDC may absorb impacts applied thereto from the outside and may prevent foreign substances/moisture from entering the display module DM to protect components accommodated in the external case EDC. Meanwhile, although not shown in figures, the external case EDC may be obtained by assembling a plurality of accommodating members.

Figure 2A:
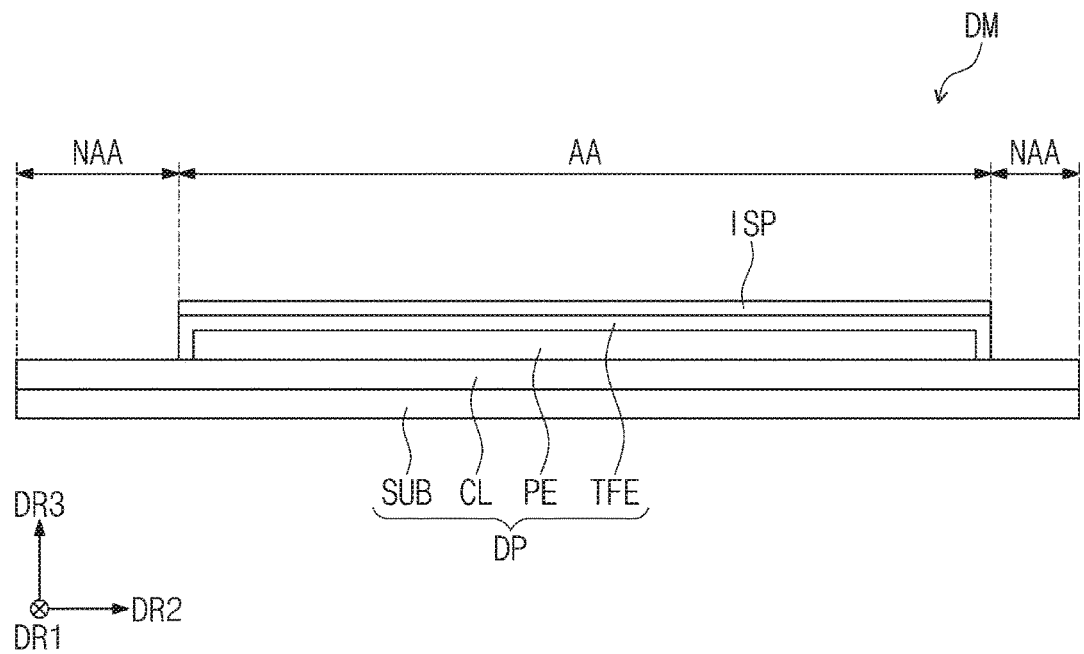
FIG. 2A is a cross-sectional view showing a display module according to an embodiment of the present disclosure.
Figure 2B:
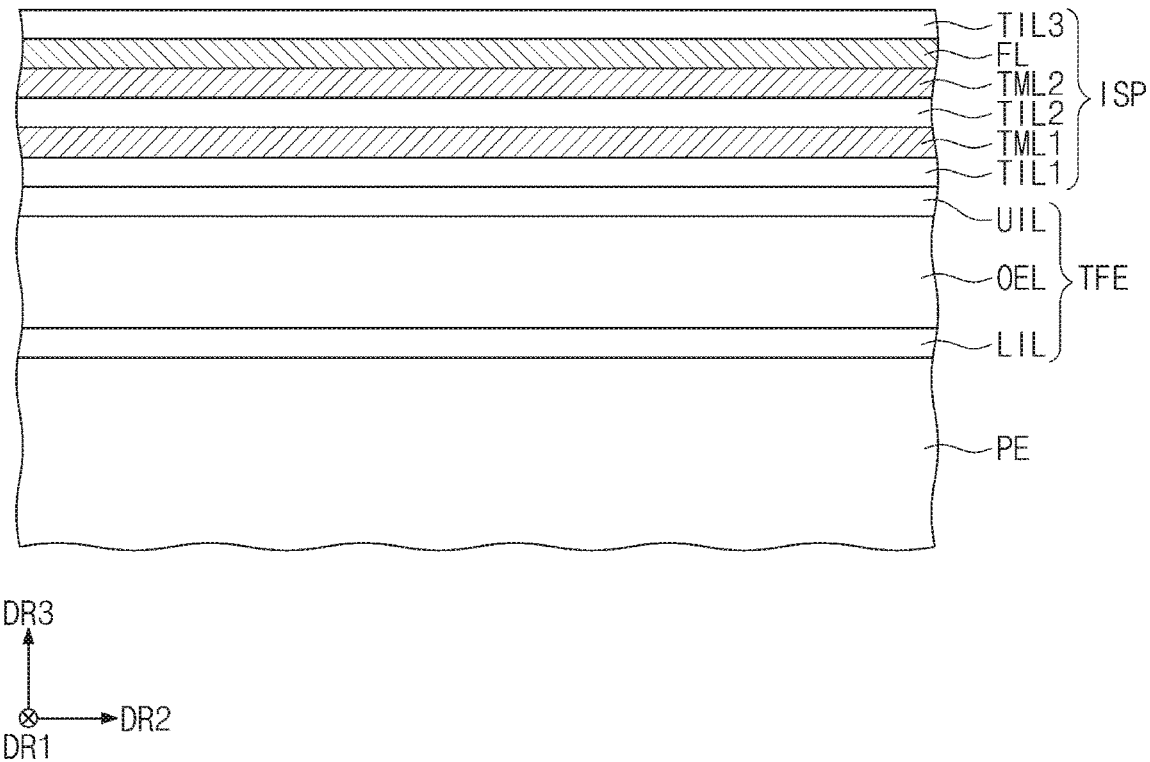
FIG. 2B is an enlarged cross-sectional view showing a portion of the display module of FIG. 2A.

FIG. 2A is a cross-sectional view showing the display module DM according to an embodiment of the present disclosure, and FIG. 2B is an enlarged cross-sectional view showing a portion of the display module DM of FIG. 2A.

Referring to FIGS. 2A and 2B, the display module DM may include the display panel DP and the input sensing panel ISP disposed on the display panel DP. The display module DM may display images in response to electrical signals and may transmit and receive information about the external input TC.

The display module DM may include an active area AA and a non-active area NAA. The active area AA is disposed between the non-active area NAA. The active area AA may be an area from which images provided from the display module DM are emitted, and the non-active area NAA may surround the active area AA, however, this is merely one example. The non-active area NAA may have a variety of shapes and should not be particularly limited. The active area AA of the display module DM may correspond to the transmission area TA.

The display panel DP may include a base layer SUB, a circuit element layer CL, a display element layer PE, and an encapsulation layer TFE.

The base layer SUB may be a flexible substrate or a rigid substrate. The base layer SUB may serve as a base layer on which elements included in the circuit element layer CL are disposed.

The circuit element layer CL may be disposed on the base layer SUB. The circuit element layer CL may include signal lines, a control circuit, and a plurality of transistors including a semiconductor layer, which are not shown.

The display element layer PE may include an organic light emitting element and a pixel definition layer, and may be disposed on the circuit element layer CL. The encapsulation layer TFE may encapsulate the display element layer PE. That is, some portions of the encapsulation layer TFE is disposed on the display element layer PE, and both end portions of the encapsulation layer TFE are disposed on the circuit element layer CL. The encapsulation layer TFE may include at least one organic layer and at least one inorganic layer.

The input sensing panel ISP may be disposed directly on the display panel DP. In the present disclosure, the expression that a component "B1" is disposed directly on a component "A1" means that no separate adhesive layers are present between the component "B1" and the component "A1". The component "B1" may be formed on a base surface provided by the component "A1" through successive processes after the component "A1" is formed.

As shown in FIG. 2B, the encapsulation layer TFE may include a first encapsulation inorganic layer LIL, an organic layer OEL, and a second encapsulation inorganic layer UIL.

The first encapsulation inorganic layer LIL may cover the display element layer PE. The first encapsulation inorganic layer LIL may prevent the external moisture or oxygen from entering an organic light emitting element OLED (refer to FIG. 4B). For example, the first encapsulation inorganic layer LIL may include silicon nitride, silicon oxide, or a compound thereof. The first encapsulation inorganic layer LIL may be formed through a chemical vapor deposition process.

The organic layer OEL may be disposed on the first encapsulation inorganic layer LIL and may be connected to the first encapsulation inorganic layer LIL. The organic layer OEL may provide a flat surface on the first encapsulation inorganic layer LIL. Uneven portions or particles on the first encapsulation inorganic layer LIL may be covered by the organic layer OEL, and thus, the organic layer OEL may prevent the uneven portions or particles on the first encapsulation inorganic layer LIL from exerting influences on the components formed on the organic layer OEL. In addition, the organic layer OEL may alleviate stress between layers that are in contact with each other. The organic layer OEL may include an organic material and may be formed through a solution process, such as a spin coating process, a slit coating process, an inkjet process, or the like.

The second encapsulation inorganic layer UIL may be disposed on the organic layer OEL to cover the organic layer OEL. When compared with a case where the second encapsulation inorganic layer UIL is disposed directly on the first encapsulation inorganic layer LIL, the second encapsulation inorganic layer UIL may be stably formed on a relatively flat surface. The second encapsulation inorganic layer UIL may encapsulate moisture emitted from the organic layer OEL and may prevent the moisture from leaking the outside of the encapsulation layer TFE. The second encapsulation inorganic layer UIL may include silicon nitride, silicon oxide, or a compound thereof. The second encapsulation inorganic layer UIL may be formed through a chemical vapor deposition process.

The input sensing panel ISP may be disposed on the encapsulation layer TFE. The input sensing panel ISP may be disposed directly on the encapsulation layer TFE and may be formed together with the encapsulation layer TFE through successive processes. The input sensing panel ISP may sense the external input using one of a self-capacitance method and a mutual capacitance method. Conductive patterns included in the input sensing panel ISP may be arranged and connected in various ways in accordance with the sensing method.

The input sensing panel ISP may include a plurality of sensing insulating layers TIL1, TIL2, and TIL3, a plurality of conductive patterns TML1 and TML2, and a functional layer FL. The sensing insulating layers TIL1, TIL2, and TIL3 may include a first sensing insulating layer TIL1 a second sensing insulating layer TIL2, and a third sensing insulating layer TIL3, each of which includes one of an inorganic material and an organic material. The functional layer FL may include a piezoelectric pattern and a light blocking pattern.

The first sensing insulating layer TIL1 may be disposed directly on the second encapsulation inorganic layer UIL of the encapsulation layer TFE. First conductive patterns TML1 may be disposed on the first sensing insulating layer TIL1. The second sensing insulating layer TIL2 may be disposed on the first sensing insulating layer TIL1 and may cover the first conductive patterns TML1. Second conductive patterns TML2 may be disposed on the second sensing insulating layer TIL2. The functional layer FL may be disposed on the second sensing insulating layer TIL2 and may cover the second conductive patterns TML2. The third sensing insulating layer TIL3 may be disposed on the second sensing insulating layer TIL2 and may cover the functional layer FL.

The functional layer FL may include a piezoelectric material, and a volume of the functional layer FL may be changed due to a voltage applied to the second conductive patterns TML2. Accordingly, a viewing angle may be changed by adjusting a size of the light emitting area to meet a user's desire. The functional layer FL will be described in detail with reference to FIGS. 5C, 7A, and 7B.

The conductive patterns TML1 and TML2 may include one of a metal material or a transparent conductive material having a single-layer structure. For example, the metal material may include molybdenum, silver, titanium, copper, aluminum, and alloys thereof.

The transparent conductive material may include a transparent conductive oxide, such as indium tin oxide (ITO), indium zinc oxide (IZO), zinc oxide (ZnO), indium tin zinc oxide (ITZO), or the like. In addition, the transparent conductive material may include conductive polymer such as PEDOT, metal nanowire, graphene, or the like.

The conductive patterns TML1 and TML2 may include metal layers having the multi-layer structure. The metal layers may have a three-layer structure of titanium/aluminum/titanium. The conductive patterns TML1 and TML2 having the multi-layer structure may include at least one metal layer and at least one transparent conductive layer.

Figure 3:
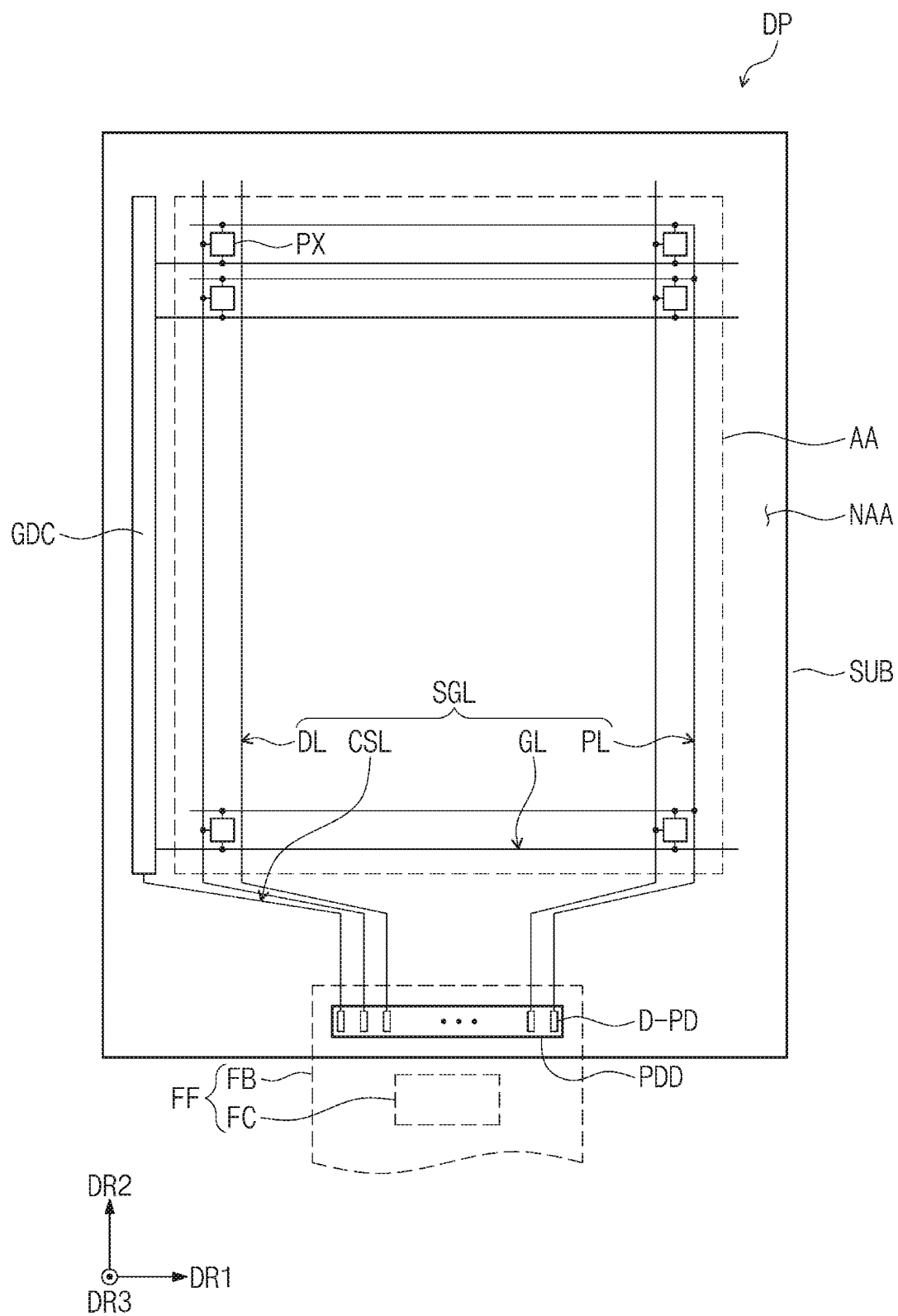
FIG. 3 is a plan view showing a display panel according to an embodiment of the present disclosure.
Figure 4A:
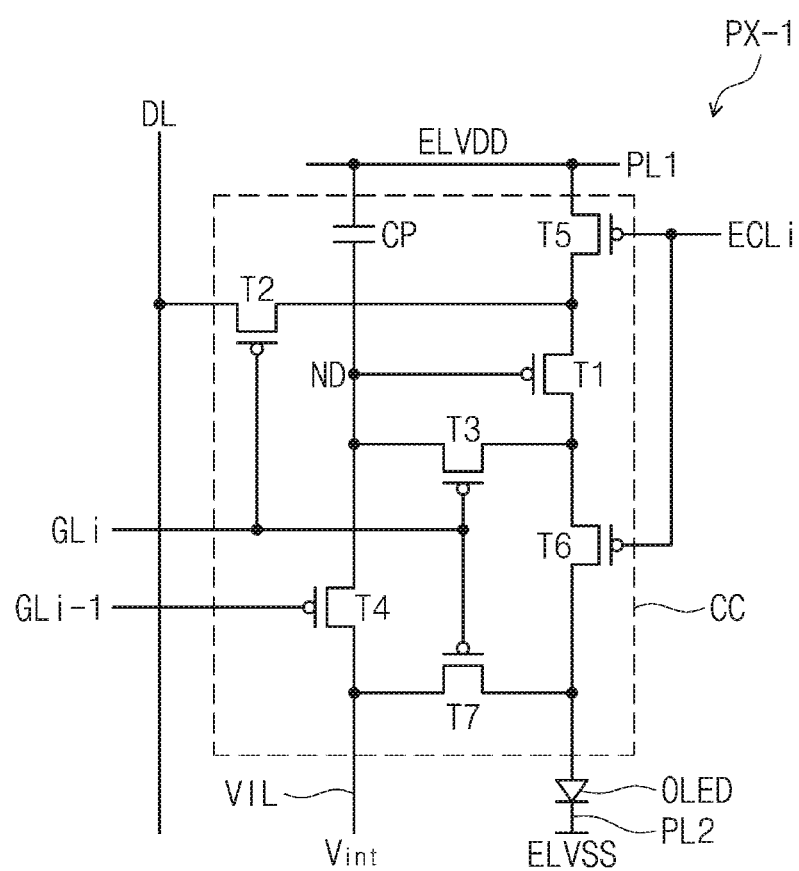
FIG. 4A is an equivalent circuit diagram showing a pixel according to an embodiment of the present disclosure.
Figure 4B:
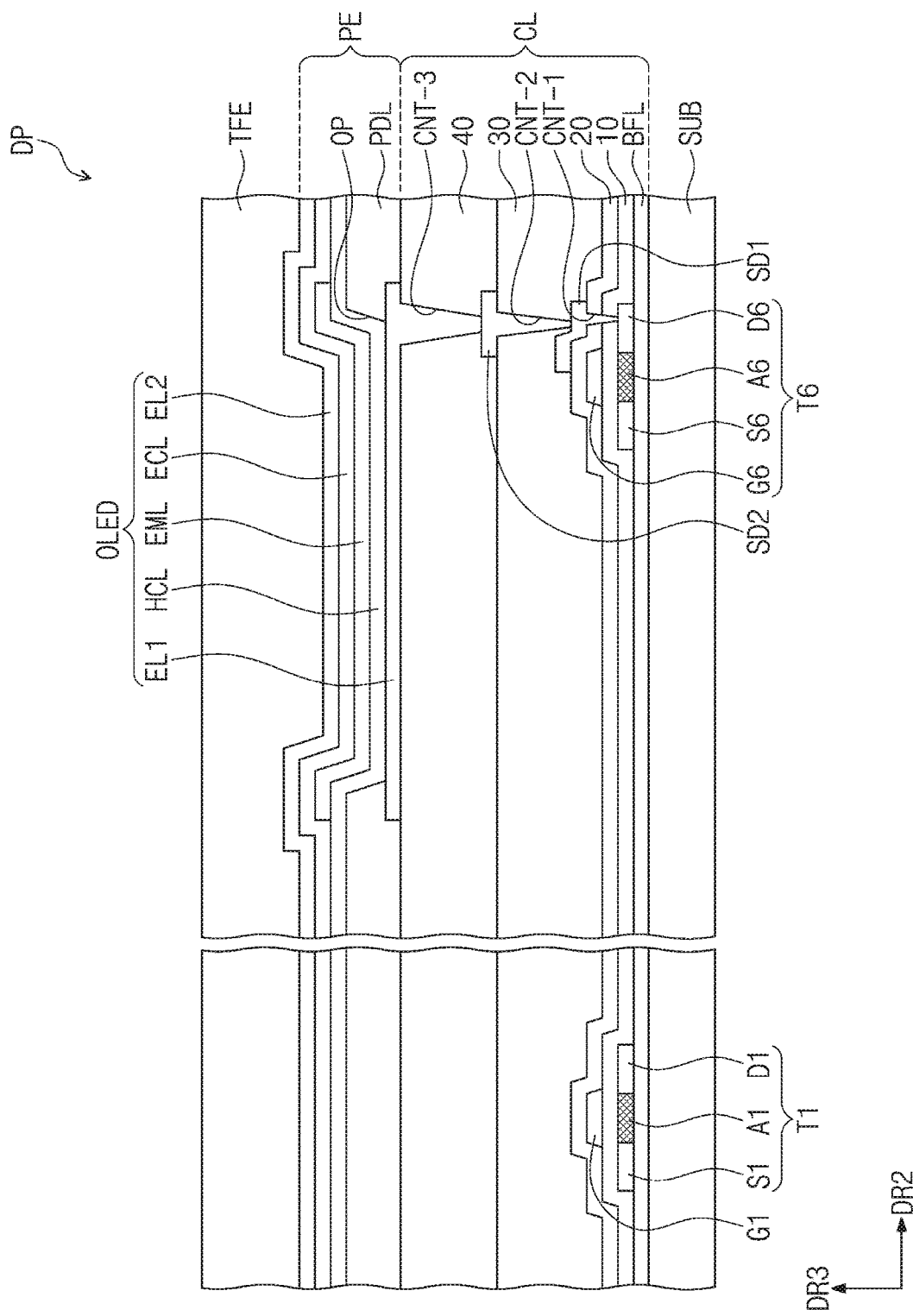
FIG. 4B is a cross-sectional view showing a pixel according to an embodiment of the present disclosure.

FIG. 3 is a plan view showing the display panel DP according to an embodiment of the present disclosure. FIG. 4A is an equivalent circuit diagram showing a pixel PX-1 according to an embodiment of the present disclosure. FIG. 4B is a cross-sectional view showing the pixel according to an embodiment of the present disclosure.

Referring to FIG. 3, the display panel DP may include a driving circuit GDC, a plurality of signal lines SGL, and a plurality of pixels PX. The display panel DP may include a pixel pad part PDD, and the pixel pad part PDD is disposed in the non-display area NAA. The pixel pad part PDD may include pixel pads D-PD each being connected to a corresponding signal line among the signal lines SGL. For the convenience of explanation, a first flexible circuit board FF connected to the pixel pad part PDD is indicated by a dotted line.

The pixels PX may be arranged in the active area AA. Each of the pixels PX may include the organic light emitting element OLED and a pixel driving circuit connected to the organic light emitting element OLED. The driving circuit GDC, the signal lines SGL, the pixel pad part PDD, and the pixel driving circuit may be included in the circuit layer CL shown in FIG. 2A.

The driving circuit GDC may include a gate driving circuit. The gate driving circuit may generate a plurality of gate signals and may sequentially output the gate signals to a plurality of gate lines GL described later. The gate driving circuit may further output another control signal to the pixel driving circuit.

The gate driving circuit may include a plurality of thin film transistors formed through the same process as the driving circuit of the pixels PX, for instance, a low temperature polycrystalline silicon (LTPS) process or a low temperature polycrystalline oxide (LTPO) process.

The signal lines SGL may include the gate lines GL, data lines DL, a power line PL, and a control signal line CSL. Each of the gate lines GL may be connected to a corresponding pixel PX among the pixels PX, and each of the data lines DL may be connected to a corresponding pixel PX among the pixels PX. The power line PL may be connected to the pixels PX. The control signal line CSL may apply control signals to the gate driving circuit.

The pixel pad part PDD may be connected to the first flexible circuit board FF, and the pixel pads D-PD of the pixel pad part PDD may be connected to pads (not shown) included in the first flexible circuit board FF. Accordingly, the display panel DP and the main circuit board MF may be connected to each other via the first flexible circuit board FF.

The pixel pads D-PD may be provided by exposing some of lines that are arranged on the circuit element layer CL and are not covered by an insulating layer included in the circuit element layer CL.

The pixel pads D-PD may be connected to corresponding pixels PX via the signal lines SGL. In addition, any one of the pixel pads D-PD may be connected to the driving circuit GDC.

Referring to FIG. 4A, a pixel PX-1 among the pixels PX shown in FIG. 3 may be electrically connected to a plurality of signal lines SGL. FIG. 4A shows gate lines GLi and GLi−1, a data line DL, a first power line PL1, a second power line PL2, an initialization power line VIL, and a light emitting control line ECLi among the signal lines, however, they are merely one example. The pixel PX-1 according to an embodiment of the present disclosure may be further connected to various signal lines, and some of the signal lines shown in FIG. 4A may be omitted.

The pixel PX-1 may include the organic light emitting element OLED and a pixel circuit CC. The pixel circuit CC may include a plurality of transistors T1, T2, T3, T4, T5, T6, and T7 and a capacitor CP. The pixel circuit CC may control an amount of current flowing through the organic light emitting element OLED in response to a data signal.

The organic light emitting element OLED may emit a light at a predetermined luminance in response to the amount of current provided from the pixel circuit CC. To this end, a first power ELVDD may have a level that is set higher than a level of a second power ELVSS.

Each of the transistors T1, T2, T3, T4, T5, T6, and T7 may include an input electrode (or a source electrode), an output electrode (or a drain electrode), and a control electrode (or a gate electrode). In the following descriptions, for the convenience of explanation, one electrode of the input electrode and the output electrode may be referred to as a first electrode, and the other electrode of the input electrode and the output electrode may be referred to as a second electrode.

A first electrode of a first transistor T1 is connected to the first power line PL1 via a fifth transistor T5. The first power line PL1 may be a line to which the first power ELVDD is applied. A second electrode of the first transistor T1 is connected to an anode electrode of the organic light emitting element OLED via a sixth transistor T6. The first transistor T1 may be referred to as a driving transistor in the present disclosure. The first transistor T1 controls the amount of current flowing through the organic light emitting element OLED in response to a voltage applied to a control electrode of the first transistor T1.

A second transistor T2 is connected between the data line DL and the first electrode of the first transistor T1. A control electrode of the second transistor T2 is connected to an i-th gate line GLi. When an i-th gate signal is applied to the i-th gate line GLi, the second transistor T2 is turned on and electrically connects the data line DL to the first electrode of the first transistor T1.

A third transistor T3 is connected between the second electrode of the first transistor T1 and the control electrode of the first transistor T1. A control electrode of the third transistor T3 is connected to the i-th gate line GLi. When the i-th gate signal is applied to the i-th gate line GLi, the third transistor T3 is turned on and electrically connects the second electrode of the first transistor T1 to the control electrode of the first transistor T1. Accordingly, when the third transistor T3 is turned on, the first transistor T1 is connected in a diode configuration.

A fourth transistor T4 is connected between a node ND and the initialization power line VIL. A control electrode of the fourth transistor T4 is connected to an (i−1)th gate line GLi−1. The node ND may be a node at which the fourth transistor T4 is connected to the control electrode of the first transistor T1. When an (i−1)th gate signal is applied to the (i−1)th gate line GLi−1, the fourth transistor T4 is turned on and provides an initialization voltage Vint to the node ND.

The fifth transistor T5 is connected between the first power line PL1 and the first electrode of the first transistor T1. The sixth transistor T6 is connected between the second electrode of the first transistor T1 and the anode electrode of the organic light emitting element OLED. A control electrode of the fifth transistor T5 and a control electrode of the sixth transistor T6 are connected to an i-th light emitting control line ECLi.

A seventh transistor T7 is connected between the initialization power line VIL and the anode electrode of the organic light emitting element OLED. A control electrode of the seventh transistor T7 is connected to the i-th gate line GLi. When the i-th gate signal is applied to the i-th gate line GLi, the seventh transistor T7 is turned on and provides the initialization voltage Vint to the anode electrode of the organic light emitting element OLED.

The seventh transistor T7 may improve a black expression ability of the pixel PX-1. In detail, when the seventh transistor T7 is turned on, a parasitic capacitance (not shown) of the organic light emitting element OLED is discharged. Accordingly, when implementing a black luminance, the organic light emitting element OLED does not emit the light due to a leakage current from the first transistor T1, and thus the black expression ability may be improved.

Additionally, in FIG. 4A, the control electrode of the seventh transistor T7 is connected to the i-th gate line GLi, however, it should not be limited thereto or thereby. According to an embodiment, the control electrode of the seventh transistor T7 may be connected to the (i−1)th gate line GLi−1 or an (i+1)th gate line (not shown).

FIG. 4A shows a PMOS as a reference of the pixel circuit CC, however, it should not be limited thereto or thereby. According to an embodiment, the pixel circuit CC may be implemented by an NMOS. According to an embodiment, the pixel circuit CC may be implemented by a combination of the NMOS and the PMOS.

The capacitor CP is disposed between the first power line PL1 and the node ND. The capacitor CP is charged with a voltage corresponding to the data signal. When the fifth and sixth transistors T5 and T6 are turned on due to the voltage charged in the capacitor CP, the amount of the current flowing through the first transistor T1 may be determined.

The organic light emitting element OLED may be electrically connected to the sixth transistor T6 and the second power line PL2. The organic light emitting element OLED may receive the second power ELVSS via the second power line PL2. The organic light emitting element OLED may include a light emitting layer.

The organic light emitting element OLEDD may emit the light with the voltage corresponding to a difference between the signal provided through the sixth transistor T6 and the second power ELVSS provided through the second power line PL2.

In the present disclosure, the structure of the pixel PX-1 should not be limited to the structure shown in FIG. 4A. According to an embodiment of the present disclosure, the pixel PX-1 may be implemented in various ways to allow the light emitting element LD to emit the light.

Referring to FIG. 4B, the display panel DP may include a plurality of insulating layers, a semiconductor pattern, a conductive pattern, and a signal line. An insulating layer, a semiconductor layer, and a conductive layer may be formed by a coating or depositing process. Then, the insulating layer, the semiconductor layer, and the conductive layer may be selectively patterned by a photolithography process. The semiconductor pattern, the conductive pattern, and the signal line included in the circuit element layer CL and the display element layer PE may be formed through the above processes.

The base layer SUB may include a synthetic resin layer. The synthetic resin layer may include a heat-curable resin. The base layer SUB may have a multi-layer structure. For instance, the base layer SUB may have a three-layer structure of a synthetic resin layer, an adhesive layer, and a synthetic resin layer. In particular, the synthetic resin layer may be a polyimide-based resin layer, and a material for the synthetic resin layer should not be particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. The base layer SUB may include a glass substrate, a metal substrate, or an organic/inorganic composite substrate.

At least one inorganic layer may be disposed on an upper surface of the base layer SUB. The inorganic layer may include at least one of aluminum oxide, titanium oxide, silicon oxide, silicon oxynitride, zirconium oxide, and hafnium oxide. The inorganic layer may be formed in multiple layers. The inorganic layers may form a barrier layer and/or a buffer layer.

In the present embodiment, the display panel DP may include a buffer layer BFL. The buffer layer BFL may increase a coupling force between the base layer SUB and the semiconductor pattern included in the transistor. The base layer SUB may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include poly silicon, however, it should not be limited thereto or thereby. The semiconductor pattern may include amorphous silicon or oxide semiconductor.

FIG. 4B shows only a portion of the semiconductor pattern, and the semiconductor pattern may be further disposed in other areas of the pixel PX in a plane. The semiconductor pattern may be arranged with a specific rule over the pixels PX. The semiconductor pattern may have different electrical properties depending on whether it is doped or not or whether it is doped with an N-type dopant or a P-type dopant. The semiconductor pattern may include a doped region and a non-doped region. The doped region may be doped with the N-type dopant or the P-type dopant. A P-type transistor may include a doped region doped with the P-type dopant.

The doped region may have a conductivity greater than that of the non-doped region and may substantially serve as an electrode or signal line. The non-doped region may substantially correspond to an active (or a channel) of the transistor. In other words, a portion of the semiconductor pattern may be the active of the transistor, another portion of the semiconductor pattern may be a source or a drain of the transistor, and the other portion of the semiconductor pattern may be an additional electrode or a signal line.

As shown in FIG. 4B, a source Si, an active A1, and a drain D1 of the first transistor T1 may be formed from the semiconductor pattern. A source S6, an active A6, and a drain D6 of the sixth transistor T6 may be formed from the semiconductor pattern. The sources Si and S6 and the drains D1 and D6 may extend in opposite directions to each other from the actives A1 and A6 in a cross-section.

A first intermediate insulating layer 10 may be disposed on the buffer layer BFL. The first intermediate insulating layer 10 may commonly overlap a plurality of pixels and may cover the semiconductor pattern. The first intermediate insulating layer 10 may be an inorganic layer and/or an organic layer and may have a single-layer or multi-layer structure.

The first intermediate insulating layer 10 may include at least one of aluminum oxide, titanium oxide, silicon oxide, silicon oxynitride, zirconium oxide, and hafnium oxide. In the present embodiment, the first intermediate insulating layer 10 may have a single-layer structure of a silicon oxide layer.

Not only the first intermediate insulating layer 10 but also, an insulating layer of the circuit element layer CL described later may be an inorganic layer and/or an organic layer and may have a single-layer or multi-layer structure. The inorganic layer may include at least one of the above-mentioned materials.

Gates G1 and G6 may be disposed on the first intermediate insulating layer 10. The gates G1 and G6 may be a portion of a metal pattern. The gates G1 and G6 may overlap the actives A1 and A6. The gates G1 and G6 may serve as a mask in a process of doping the semiconductor pattern.

A second intermediate insulating layer 20 may be disposed on the first intermediate insulating layer 10 and may cover the gates G1 and G6. The second intermediate insulating layer 20 may commonly overlap the pixels. The second intermediate insulating layer 20 may be an inorganic layer and/or an organic layer and may have a single-layer or multi-layer structure. In the present embodiment, the second intermediate insulating layer 20 may have a single-layer structure of a silicon oxide layer.

A first additional electrode SD1 may be disposed on the second intermediate insulating layer 20. The first additional electrode SD1 may be connected to the drain D6 via a contact hole CNT-1 defined through the first intermediate insulating layer 10 and the second intermediate insulating layer 20.

A first insulating layer 30 is disposed on the second intermediate insulating layer 20. The first insulating layer 30 may be an organic layer. A second additional electrode SD2 may be connected to the first additional electrode SD1 via a contact hole CNT-2 defined through the first insulating layer 30.

A second insulating layer 40 may be disposed on the first insulating layer 30 to cover the second additional electrode SD2. The second insulating layer 40 may be an organic layer. A first electrode EL1 may be disposed on the second insulating layer 40. The first electrode EL1 may be connected to the second additional electrode SD2 via a contact hole CNT-3 defined through the second insulating layer 40. A display opening OP may be defined through a pixel definition layer PDL. At least a portion of the first electrode EL1 may be exposed through the display opening OP of the pixel definition layer PDL.

A hole control layer HCL may include a hole transport layer and may further include a hole injection layer. A light emitting layer EML may be disposed on the hole control layer HCL. The light emitting layer EML may be disposed in an area corresponding to the display opening OP. That is, the light emitting layer EML may be formed in each of the pixels after being divided into portions.

An electron control layer ECL may be disposed on the light emitting layer EML. The electron control layer ECL may include an electron transport layer and may further include an electron injection layer. The hole control layer HCL and the electron control layer ECL may be commonly formed in the pixels using an open mask. A second electrode EL2 may be disposed on the electron control layer ECL. The second electrode EL2 may have an integral shape and may be commonly disposed over the pixels.

The encapsulation layer TFE may be disposed on the second electrode EL2. The encapsulation layer TFE may be commonly disposed over the pixels. In the present embodiment, the encapsulation layer TFE may directly cover the second electrode EL2. According to an embodiment, a capping layer may be further disposed between the second electrode EL2 and the encapsulation layer TFE to cover the second electrode EL2. In this case, the encapsulation layer TFE may directly cover the capping layer.

The encapsulation layer TFE may be disposed on the organic light emitting element OLED to encapsulate the organic light emitting element OLED. Although not shown in figures, a capping layer may be further disposed between the second electrode EL2 and the organic light emitting element OLED to cover the second electrode EL2. The encapsulation layer TFE shown in FIG. 4B may correspond to the encapsulation layer TFE described with reference to FIG. 2B.

Referring back to FIG. 1B, the main circuit board MF may include a base circuit board MP and a driving element MC. The base circuit board MP may be connected to the first flexible circuit board FF to be electrically connected to the display panel DP, and the base circuit board MP may be connected to a second flexible circuit board TF to be electrically connected to the input sensing panel ISP. The base circuit board MP may include a flexible circuit board (FPCB).

The driving element MC may include a timing controller. The timing controller may receive input image signals and may convert the input image signals to image data appropriate to an operation of the pixels. In addition, the timing controller may receive various control signals, e.g., a vertical synchronization signal, a horizontal synchronization signal, a main clock signal, and a data enable signal and may output signals corresponding to the control signals, respectively. Further, the driving element MC may include a controller to control the input sensing panel ISP, however, it should not be particularly limited.

The first flexible circuit board FF may be connected to one side of the display panel DP to electrically connect the display panel DP to the main circuit board MF. The first flexible circuit board FF may include a base film FB and a driving chip FC.

The base film FB may have flexibility and may include circuit lines (not shown). Accordingly, the base film FB may be provided in various forms to correspond to the purpose and shape of the display panel DP.

The driving chip FC may be mounted on the base film FB in a chip-on-film (COF) manner. The driving chip FC may include a driving element, e.g., a data driving circuit, to drive the pixels. In the present embodiment, one first flexible circuit board FF is shown, however, it should not be limited thereto. According to an embodiment, the first flexible circuit board FF may be provided in plural and may be connected to the display panel DP.

The second flexible circuit board FF may be connected to one side of the input sensing panel ISP to electrically connect the input sensing panel ISP to the main circuit board MF. The second flexible circuit board TF may have flexibility and may include a plurality of circuit lines (not shown). The second flexible circuit board TF may transmit input sensing signals provided from the main circuit board MF to the input sensing panel ISP.

Figure 5A:
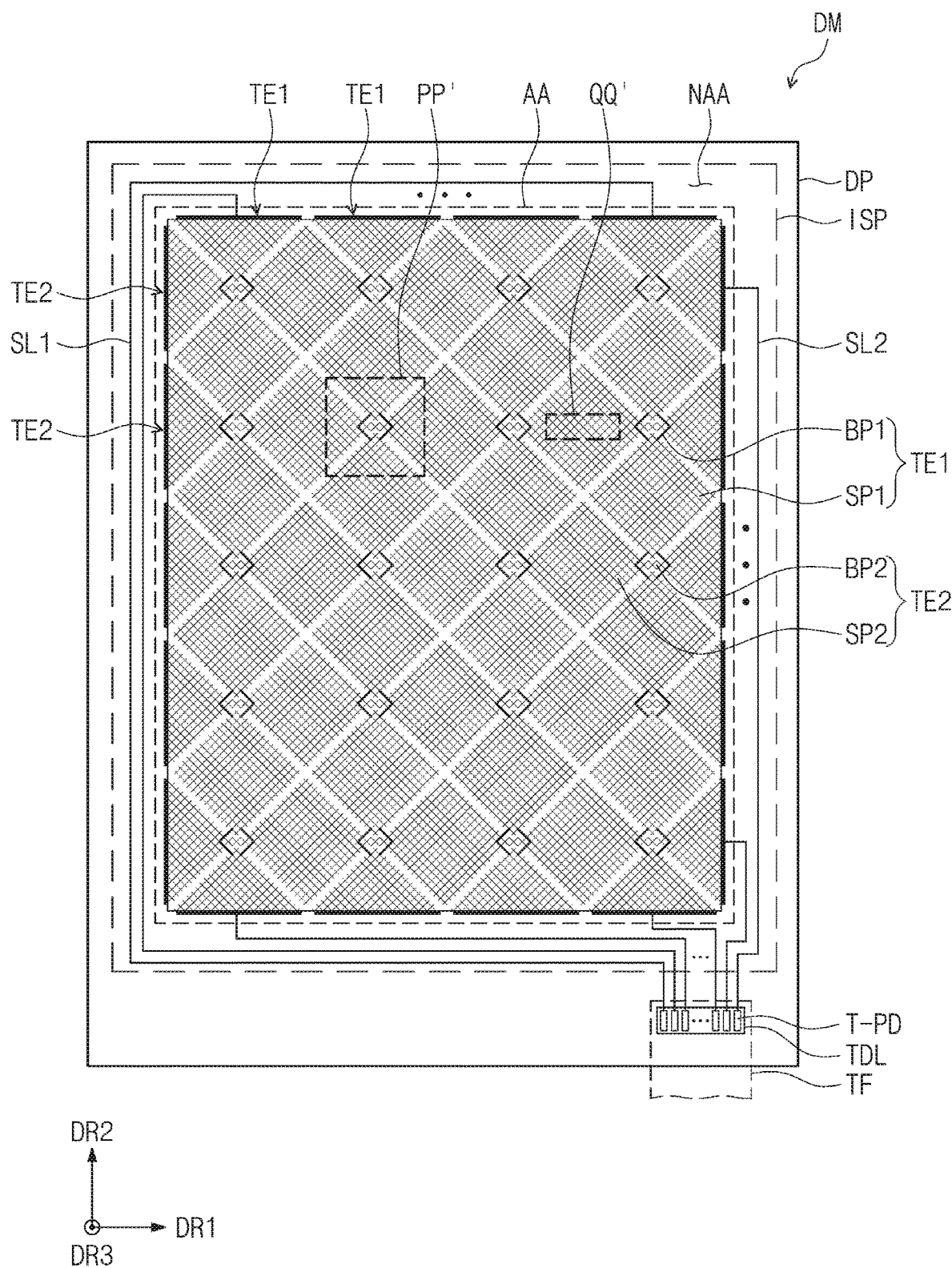
FIG. 5A is a plan view showing an input sensing panel according to an embodiment of the present disclosure.
Figure 5B:
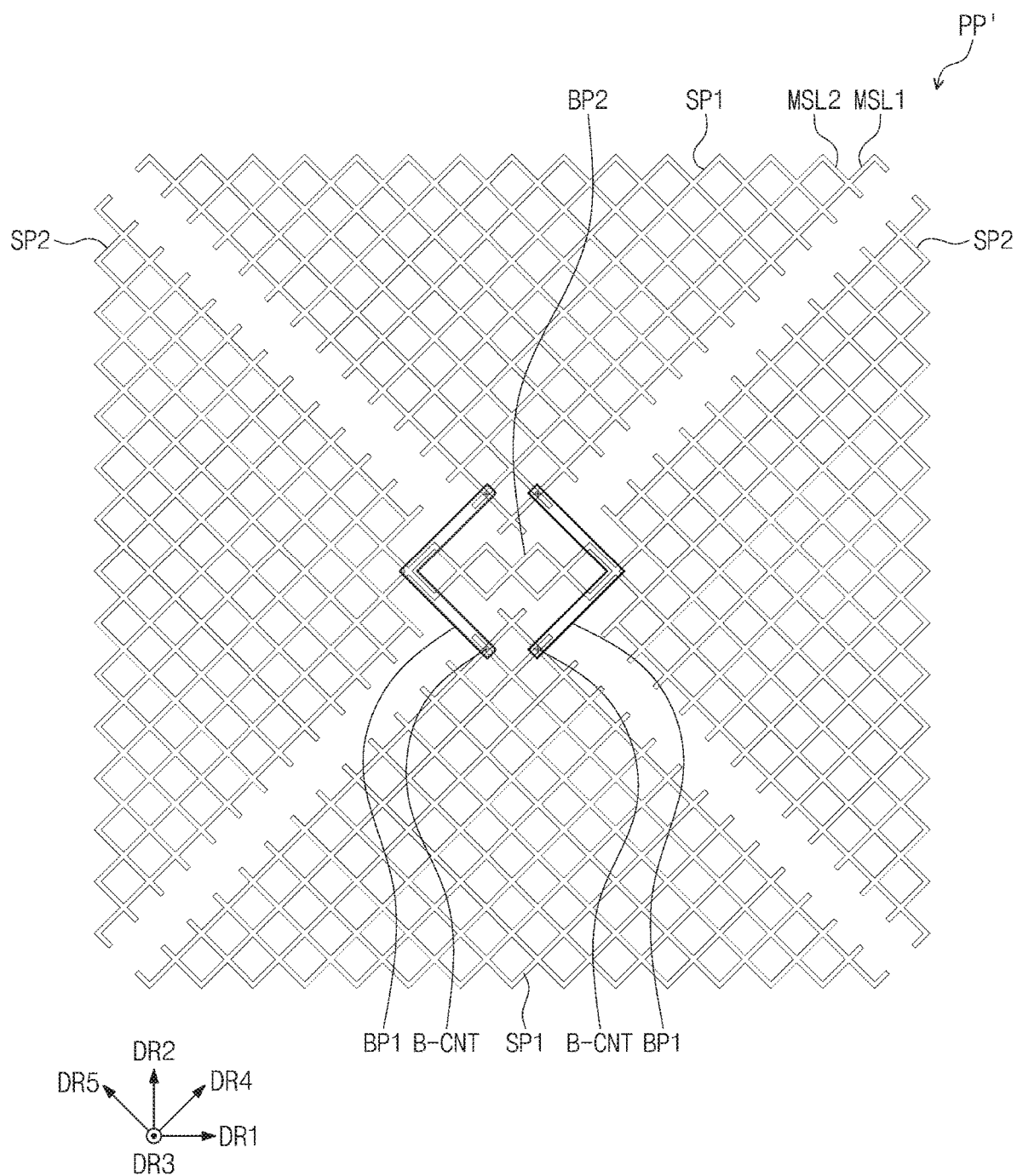
FIG. 5B is an enlarged plan view showing an area PP' of FIG. 5A.
Figure 5C:
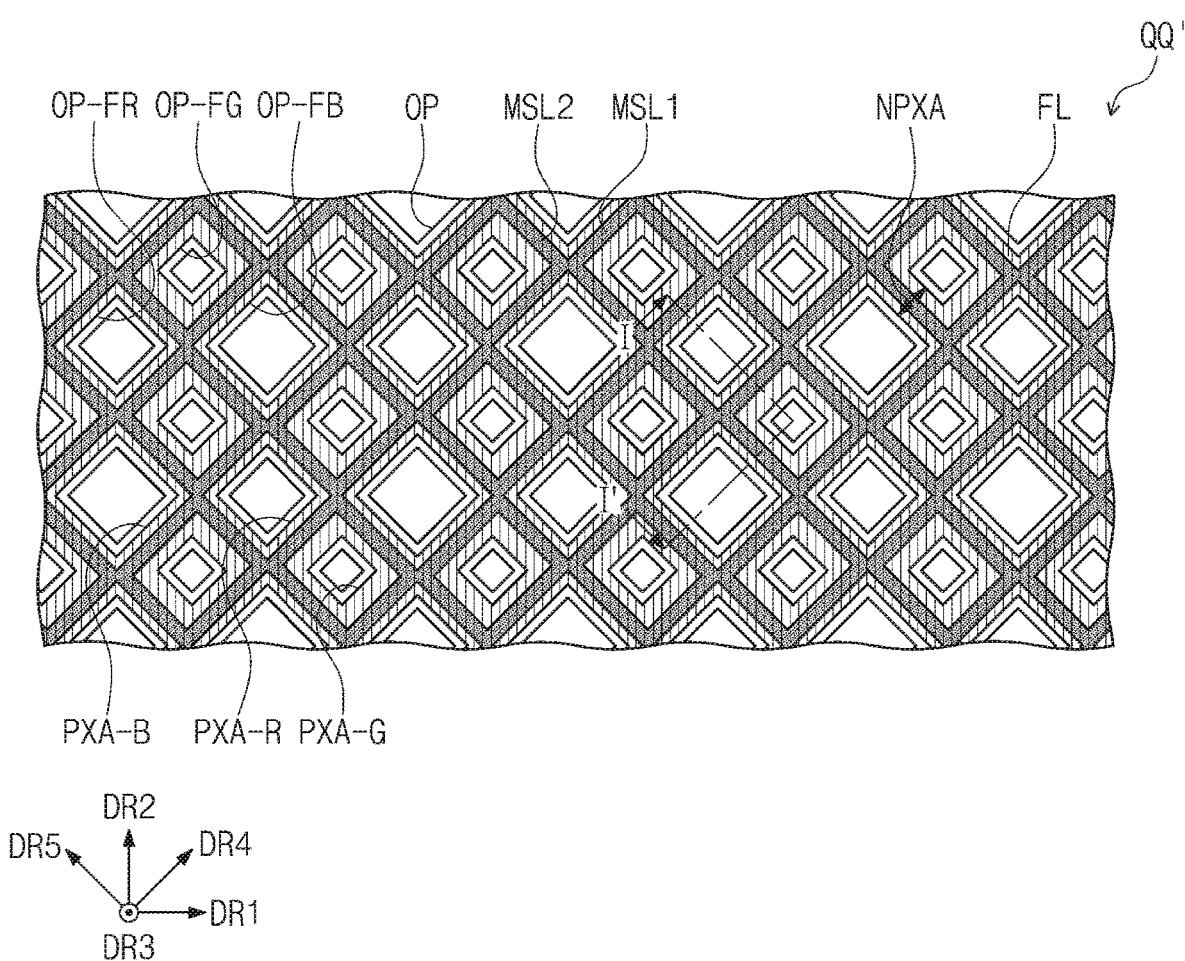
FIG. 5C is a plan view showing an arrangement relationship between a light emitting area, a conductive pattern, and a cover layer in an area QQ' of FIG. 5A.

FIG. 5A is a plan view showing the input sensing panel ISP according to an embodiment of the present disclosure, and FIG. 5B is an enlarged plan view showing an area PP' of FIG. 5A. FIG. 5C is a plan view showing an arrangement relationship between a light emitting area, a conductive pattern, and a cover layer in an area QQ' of FIG. 5A.

Referring to FIG. 5A, the input sensing panel ISP may include a first sensing electrode TE1, a second sensing electrode TE2, a first signal line SL1, a second signal line SL2, and a sensing pad part TDL including sensing pads T-PD.

In addition, the input sensing panel ISP may include a functional layer FL surrounding at least a portion of the first sensing electrode TE1 and the second sensing electrode TE2. For the convenience of explanation, the functional layer FL is omitted in FIGS. 5A and 5B.

The first sensing electrode TE1 may extend in the second direction DR2. The first sensing electrode TE1 may be provided in plural, and the first sensing electrodes TE1 may be arranged in the first direction DR1. The first sensing electrode TE1 may include first sensing patterns SP1 arranged in the second direction DR2 and a first connection pattern BP1 disposed between the first sensing patterns SP1.

The second sensing electrode TE2 may be disposed to be insulated from the first sensing electrode TE1. The second sensing electrode TE2 may extend in the first direction DR1. The second sensing electrode TE2 may be provided in plural, and the second sensing electrodes TE2 may be arranged in the second direction DR2. The second sensing electrode TE2 may include second sensing patterns SP2 arranged in the first direction DR1 and a second connection pattern BP2 disposed between the second sensing patterns SP2.

The input sensing panel ISP may sense a variation in mutual capacitance between the first sensing electrode TE1 and the second sensing electrode TE2 to sense the external input TC (refer to FIG. 1A) or may sense a variation in self-capacitance of each of the first sensing electrode TE1 and the second sensing electrode TE2 to sense the external input TC. According to an embodiment, the input sensing panel ISP may sense the external input TC in various ways, and the method of sensing the external input TC should not be particularly limited.

The first signal line SL1 may be connected to the first sensing electrode TE1. The first signal line SL1 may be disposed in the peripheral area NAA and may not be viewed from the outside. The second signal line SL2 may be connected to the second sensing electrode TE2. The second signal line SL2 may be disposed in the peripheral area NAA and may not be viewed from the outside.

Meanwhile, according to the present embodiment, one first sensing electrode TE1 may be connected to two first signal lines. Both of the opposite ends of the one first sensing electrode TE1 may be connected to different first signal lines SL1 from each other and may be connected to two first pads. Accordingly, although the first sensing electrode TE1 has a relatively longer length than that of the second sensing electrode TE2, electrical signals may be uniformly applied to all areas of the first sensing electrode TE1 and the second sensing electrode TE2. Therefore, the input sensing panel ISP may provide a uniform external input sensing environment for the entire active area AA regardless of the shape thereof.

However, this is merely one example, the second sensing electrode TE2 may be connected to two second signal lines, or each of the first sensing electrode TE1 and the second sensing electrode TE2 may be connected to only one signal line. According to an embodiment, the input sensing panel ISP may be driven in various ways, and it should not be limited thereto or thereby.

The sensing pad part TDL may be connected to the second flexible circuit board TF, and the sensing pads T-PD of the sensing pad part TDL may be connected to pads (not shown) included in the second flexible circuit board TF. Accordingly, the input sensing panel ISP may be connected to the main circuit board MF via the second flexible circuit board TF.

FIG. 5B is an enlarged plan view showing a portion of each of the first sensing patterns SP1, the first connection pattern BP1, the second sensing patterns SP2, and the second connection pattern BP2, which form one pattern of the sensing electrodes TE1 and TE2 (refer to FIG. 5A).

The input sensing panel ISP may include mesh lines. The mesh lines may include a first mesh line MSL1 and a second mesh line MSL2. The first mesh line MSL1 may extend in a fourth direction DR4, and the second mesh line MSL2 may cross the first mesh line MSL1 and may extend in a fifth direction DR5.

The first conductive patterns TML1 described with reference to FIG. 2B may include the first connection pattern BP1. The second conductive patterns TML2 described with reference to FIG. 2B may include the first sensing patterns SP1, the second sensing patterns SP2, and the second connection pattern BP2.

According to the present embodiment, the first sensing patterns SP1, the second sensing patterns SP2, and the second connection pattern BM2, which form the second conductive patterns TML2, may include mesh lines MSL1 and MSL2.

The first connection pattern BP1 may be disposed on the first sensing insulating layer TIL1 and may be covered by the second sensing insulating layer TIL2. The first sensing patterns SP1, the second sensing patterns SP2, and the second connection pattern BP2 may be disposed on the second sensing insulating layer TIL2 and may be covered by the third sensing insulating layer TIL3 (refer to FIG. 2B).

Each of contact holes B-CNT may be defined through the second sensing insulating layer TIL2, and at least two of the first sensing patterns SP1 and the first connection pattern BP1 may be connected to each other via the contact holes B-CNT. That is, there are at least two first sensing patterns SP1 crossing each other and the first connection pattern BP1 at the contact holes B-CNT.

FIG. 5C shows a relationship between the light emitting areas PXA-R, PXA-G, and PXA-B and the second conductive patterns TML2, which are included in the input sensing panel ISP, and between the light emitting areas PXA-R, PXA-G, and PXA-B and the functional layer FL, which is included in the input sensing panel ISP.

The functional layer FL may cover at least a portion of the mesh lines MSL1 and MSL2. FIG. 5C shows a structure in which the functional layer FL entirely covers the mesh lines MSL1 and MSL2. However, it should not be limited thereto or thereby, and the functional layer FL may cover only a portion of the mesh lines MSL1 and MSL2.

Functional openings OP-FR, OP-FG, and OP-FB may be defined by an outer edge of the functional layer FL. The functional openings OP-FR, OP-FG, and OP-FB may include a first functional opening OP-FR, a second functional opening OP-FG, and a third functional opening OP-FB.

The light emitting areas PXA-R, PXA-G, and PXA-B may respectively correspond to sizes of the functional openings OP-FR, OP-FG, and OP-FB defined through the functional layer FL in a plane. Accordingly, the light emitting areas PXA-R, PXA-G, and PXA-B may increase or decrease depending on a variation in volume of the functional layer FL described later.

The non-light emitting area NPXA may be defined adjacent to the light emitting areas PXA-R, PXA-G, and PXA-B. The mesh lines MSL1 and MSL2 of the input sensing panel ISP may be disposed to overlap the non-light emitting area NPXA. Accordingly, although the input sensing panel ISP is disposed directly on the display panel DP (refer to FIG. 2A), an interference between the input sensing panel ISP and a light generated by the display panel DP may be reduced. Thus, a color purity of the display device EA (refer to FIG. 1A) may be improved.

According to the present embodiment, the light emitting areas PXA-R, PXA-G, and PXA-B may include a first light emitting area PXA-R, a second light emitting area PXA-G, and a third light emitting area PXA-B. The light emitting areas PXA-R, PXA-G, and PXA-B may provide lights having different colors from each other.

According to an embodiment, the functional layer FL may include a piezoelectric material. When a voltage is applied to the mesh lines MSL1 and MSL2, the volume of the functional layer FL may be changed due to the piezoelectric material. In this case, as the size of the functional openings OP-FR, OP-FG, and OP-FB is changed, the sizes of the light emitting areas PXA-R, PXA-G, and PXA-B may be changed. Details thereof will be described later.

The functional openings OP-FR, OP-FG, and OP-FB may have different sizes from each other. As an example, the size of the third functional opening OP-FB may be greater than the size of the first functional opening OP-FR and the size of the second functional opening OP-FG. The size of the first functional opening OP-FR may be greater than the size of the second functional opening OP-FG.

In the present embodiment, the functional openings OP-FR, OP-FG, and OP-FB have different sizes from each other, however, they should not be limited thereto or thereby. For example, the functional openings OP-FR, OP-FG, and OP-FB may have substantially the same size as each other.

The display opening OP shown in FIG. 5C may correspond to the display opening OP shown in FIG. 4B. For the convenience of explanation, the size of each of the functional openings OP-FR, OP-FG, and OP-FB are illustrated to be greater than the size of the corresponding display opening OP, however, the size of each of the functional openings OP-FR, OP-FG, and OP-FB may be substantially the same as the size of the corresponding display opening OP, and the size of each of the functional openings OP-FR, OP-FG, and OP-FB may be smaller than the size of the display opening OP due to the variation in volume of the functional layer FL.

Figure 6A:
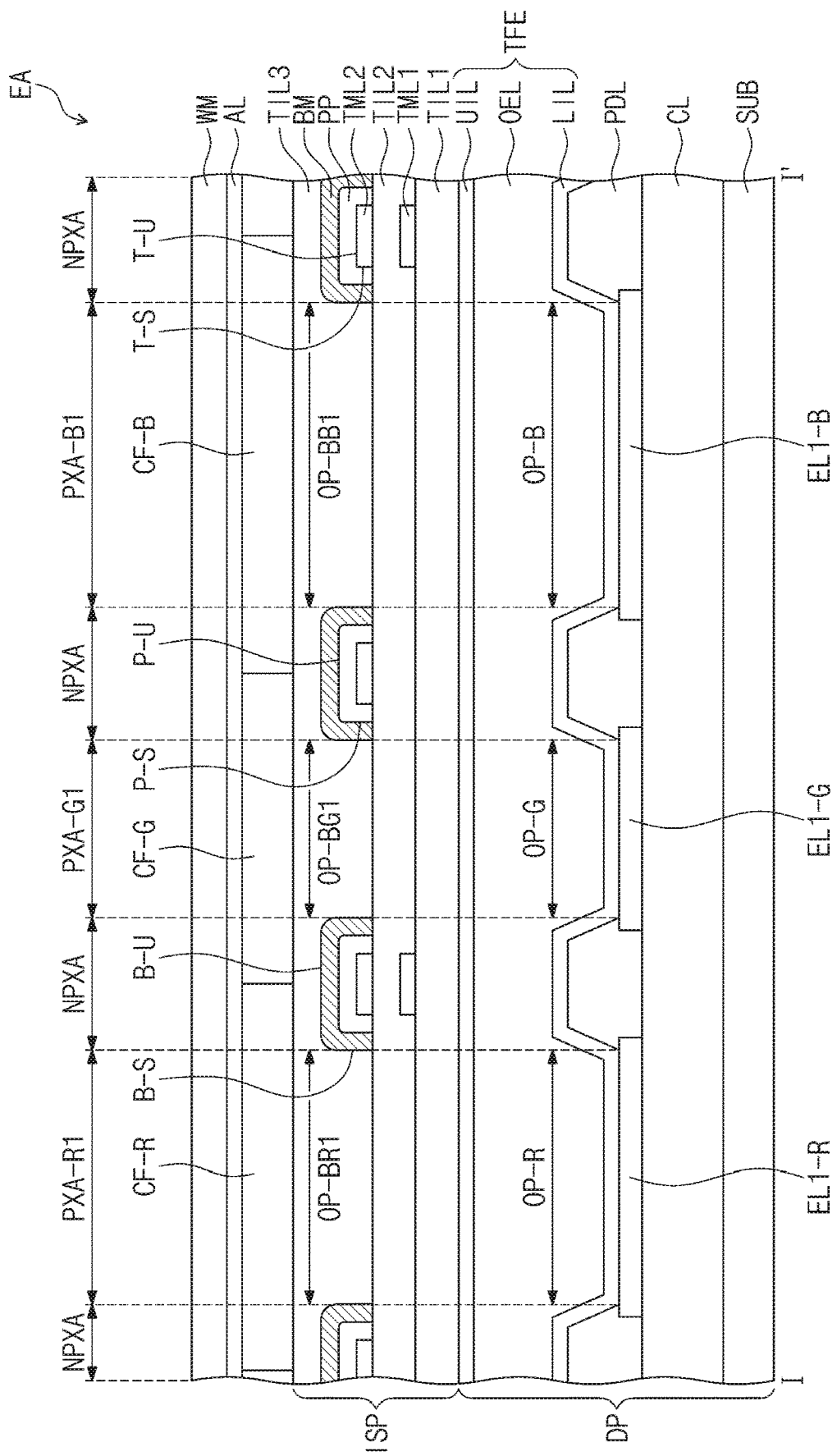
FIG. 6A is a cross-sectional view taken along line I-I' of FIG. 5C to show a display device in a first mode.
Figure 6B:
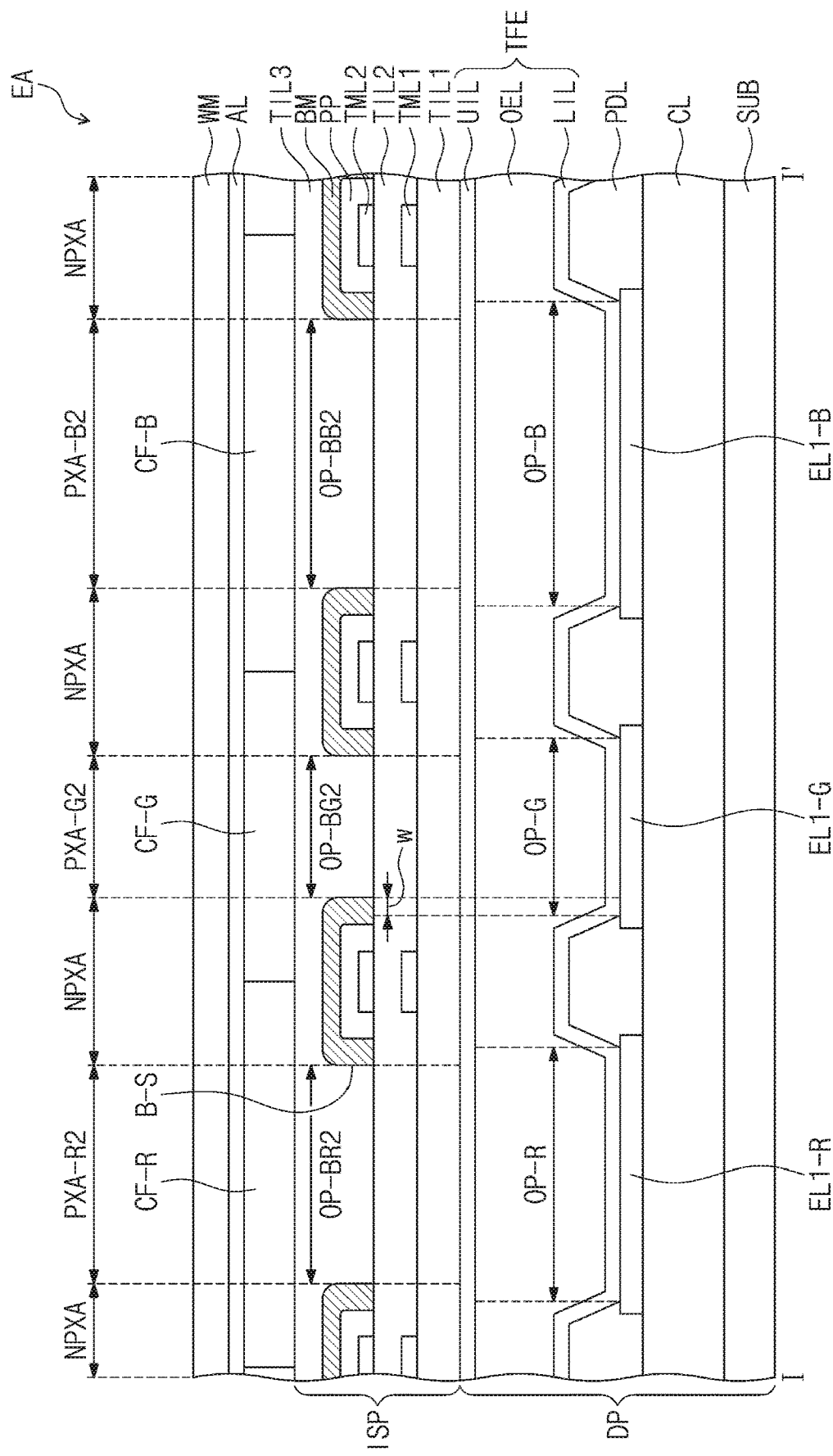
FIG. 6B is a cross-sectional view taken along line I-I' of FIG. 5C to show a display device in a second mode.

FIG. 6A is a cross-sectional view taken along line I-I' of FIG. 5C to show the display device EA in a first mode, and FIG. 6B is a cross-sectional view taken along line I-I' of FIG. 5C to show the display device EA in a second mode.

In the present disclosure, the second conductive patterns TML2 may receive different voltages from each other. As an example, the different voltages may be applied to the second conductive patterns TML2 through the first signal line SL1 (refer to FIG. 5A) and the second signal line SL2 (refer to FIG. 5A).

In the present disclosure, a state in which a positive (+) voltage is applied to the second conductive patterns TML2 is referred to as the first mode, and a state in which a negative (−) voltage is applied to the second conductive patterns TML2 is referred to as the second mode.

According to the present embodiment, a voltage of about +5V may be applied to the second conductive patterns TML2 in the first mode, and a voltage of about −5V may be applied to the second conductive patterns TML2 in the second mode, however, they should not be limited thereto or thereby. According to an embodiment, the negative voltage may be applied in the first mode, and the positive voltage may be applied in the second mode. According to an embodiment, voltages having the same polarity and different levels may be applied in each mode.

However, the present disclosure should not be limited thereto or thereby. According to an embodiment, the second conductive patterns TML2 may be connected to plural first signal lines or plural second signal lines to receive different voltages from each other, and they should not be particularly limited.

Referring to FIG. 6A, the display panel DP may include the base layer SUB, the circuit element layer CL, and the display element layer PE (refer to FIG. 2A). FIG. 6A shows only first electrodes EL1-R, EL1-G, and EL1-B and the pixel definition layer PDL among components of the display element layer PE. Details on the structure of the display element layer PE are the same as described with reference to FIG. 4B.

The circuit element layer CL may be disposed on the base layer SUB. The first electrodes EL1-R, EL1-G, and EL1-B may be disposed on the circuit element layer CL. Display openings OP-R, OP-G, and OP-B may be defined by the pixel definition layer PDL. The display opening OP described with reference to FIGS. 4B and 5C may correspond to at least one of the display openings OP-R, OP-G, and OP-B shown in FIG. 6A.

The encapsulation layer TFE may be disposed on the display element layer PE. The encapsulation layer TFE may include the first encapsulation inorganic layer LIL, the organic layer OEL, and the second encapsulation inorganic layer UIL.

The input sensing panel ISP may be disposed directly on the encapsulation layer TFE. The input sensing panel ISP may include the sensing insulating layers TIL1, TIL2, and TIL3, the conductive patterns TML1 and TML2, the piezoelectric pattern PP, and the light blocking pattern BM.

The first sensing insulating layer TIL1 may be disposed on the second encapsulation inorganic layer UIL of the encapsulation layer TFE, and the first conductive patterns TML1 may be disposed on the first sensing insulating layer TIL1. The second sensing insulating layer TIL2 may be disposed on the first sensing insulating layer TIL1 and may cover the first conductive patterns TML1. The second conductive patterns TML2 may be disposed on the second sensing insulating layer TIL2.

The piezoelectric pattern PP may be disposed on the second sensing insulating layer TIL2. The piezoelectric pattern PP may cover an upper surface T-U and a side surface T-S of the second conductive patterns TML2.

The piezoelectric pattern PP may include a single-crystalline film, ceramics, a thin-film layer, and the like. The single-crystalline film may include at least one of a crystal and lithium niobate (LiNbO3). The ceramics may include at least one of barium titanate (BaTiO3) and lead zirconate titanate (PZT). The thin-film layer may include at least one of zinc oxide (ZnO), lead zirconate titanate (PZT), and aluminum nitride (AlN). However, they should not be limited thereto or thereby as long as they are materials whose volume is variable depending on the voltage applied thereto.

The light blocking pattern BM may be disposed on the second sensing insulating layer TIL2. The light blocking pattern BM may cover an upper surface P-U and a side surface P-S of the piezoelectric pattern PP.

The light blocking pattern BM may include a material that absorbs the light. The material for the light blocking pattern BM should not be particularly limited as long as the material absorbs the light.

The display device EA may provide first mode light emitting areas PXA-R1, PXA-G1, and PXA-B1 to the user in the first mode. In the first mode, a width between side surfaces B-S adjacent to each other in the light blocking patterns BM may be defined as first transmission openings OP-BR1, OP-BG1, and OP-BB1. Sizes of the first mode light emitting areas PXA-R1, PXA-G1, and PXA-B1 may be determined depending on a variation in sizes of the first transmission openings OP-BR1, OP-BG1, and OP-BB1.

As an example, the first transmission openings OP-BR1, OP-BG1, and OP-BB1 may include a first-first transmission opening OP-BR1, a first-second transmission opening OP-BG1, and a first-third transmission opening OP-BB1.

A first-first light emitting area PXA-R1 may correspond to the size of the first-first transmission opening OP-BR1. A first-second light emitting area PXA-G1 may correspond to the size of the first-second transmission opening OP-BG1. A first-third light emitting area PXA-B1 may correspond to the size of the first-third transmission opening OP-BB1.

Each of the first transmission openings OP-BR1, OP-BG1, and OP-BB1 may overlap at least a portion of a corresponding display opening of the display openings OP-R, OP-G, and OP-B when viewed in a cross-section.

As shown in FIG. 6A, corners of the piezoelectric pattern PP and the light blocking pattern BM may have a curvature in a cross-section, however, they should not be limited thereto or thereby. According to an embodiment, the piezoelectric pattern PP and the light blocking pattern BM may have a variety of shapes in a cross-section.

The third sensing insulating layer TILS may be disposed on the second sensing insulating layer TIL2 and may cover an upper surface B-U and the side surface B-S of the light blocking pattern BM. The third sensing insulating layer TIL3 may be in contact with the second sensing insulating layer TIL2 in areas overlapping the first transmission openings OP-BR1, OP-BG1, and OP-BB1.

Color filters CF-R, CF-G, and CF-B may be disposed on the third sensing insulating layer TIL3. A first color filter CF-R, a second color filter CF-G, and a third color filter CF-B may correspond to the first-first light emitting area PXA-R, the first-second light emitting area PXA-G, and the first-third light emitting area PXA-B, respectively.

The color filters CF-R, CF-G, and CF-B may include a base resin and a dye and/or a pigment dispersed in the base resin. The base resin may be a medium in which the dye and/or the pigment are dispersed and may include various resin compositions that are referred to as binders.

The color filters CF-R, CF-G, and CF-B may reduce the reflectance of an external light. Each of the first color filter CF-R, the second color filter CF-G, and the third color filter CF-B may transmit a light in a specific wavelength range and may absorb a light in a wavelength range other than the specific wavelength range, and thus, the first color filter CF-R, the second color filter CF-G, and the third color filter CF-B may absorb most of natural light and may reflect only a portion of the natural light.

The window member WM may be disposed on the color filters CF-R, CF-G, and CF-B. The window member WM may be coupled with the color filters CF-R, CF-G, and CF-B by an adhesive layer AL.

The adhesive layer AL may be a transparent adhesive layer, such as a pressure sensitive adhesive (PSA) film, an optically clear adhesive (OCA) film, or an optically clear resin (OCR).

However, the adhesive layer AL may be a conventional adhesive and should not be particularly limited. In addition, the adhesive layer AL may be omitted.

In the present disclosure, the piezoelectric pattern PP may have the volume that is variable depending on the voltage applied to the second conductive patterns TML2. When the volume of the piezoelectric pattern BM is varied, the volume of the light blocking pattern BM may be substantially simultaneously varied with the volume of the piezoelectric pattern PP.

Hereinafter, components that are changed according to the variation in volume of the piezoelectric pattern PP and the light blocking pattern BM in the second mode will be described with reference to FIG. 6B, and detailed descriptions of components that are the same as those in FIG. 6A will be omitted.

According to the present disclosure, when the first mode is changed to the second mode, the volume of the piezoelectric pattern PP and the volume of the light blocking pattern BM may increase substantially simultaneously.

The display device EA may provide second mode light emitting areas PXA-R2, PXA-G2, and PXA-B2 to the user in the second mode. In the second mode, a width between the side surfaces B-S adjacent to each other in the light blocking patterns BM may be defined as second transmission openings OP-BR2, OP-BG2, and OP-BB2.

As sizes of the second transmission openings OP-BR2, OP-BG2, and OP-BB2 are reduced, sizes of the second mode light emitting areas PXA-R2, PXA-G2, and PXA-B2 may be reduced.

According to the present disclosure, a width of each of the second transmission openings OP-BR2, OP-BG2, and OP-BB2 may be reduced when compared with the width of each of the first transmission openings OP-BR1, OP-BG1, and OP-BB1.

As an example, a width of a second-first transmission opening OP-BR2 may be smaller than a width of the first-first transmission opening OP-BR1. A width of a second-second transmission opening OP-BG2 may be smaller than a width of the first-second transmission opening OP-BG1. A width of the second-third transmission opening OP-BB2 may be smaller than a width of the first-3 transmission opening OP-BB1.

When the first mode is switched to the second mode, a width of the light blocking pattern BM may increase by a protrusion width W in a direction toward the second mode light emitting areas PXA-R2, PXA-G2, and PXA-B2. In the present embodiment, the protrusion width W may be defined as a width of the protruded portion of the light blocking pattern BM protruded to the direction toward the second mode light emitting areas PXA-R2, PXA-G2, and PXA-B2 more than the display openings OP-R, OP-G, and OP-B with respect to a boundary of the display openings OP-R, OP-G, and OP-B when the first mode is switched to the second mode.

Accordingly, the second-first light emitting area PXA-R2 may have a light emitting area that is reduced by the protrusion width W at a left side and the protrusion width W at a right side when compared with the first-first light emitting area PXA-R1. The second-second light emitting area PXA-G2 may have a light emitting area that is reduced by the protrusion width W at the left side and the protrusion width W at the right side when compared with the first-second light emitting area PXA-G1. The second-third light emitting area PXA-B2 may have a light emitting area that is reduced by the left protrusion width W and the right protrusion width W when compared with the first-third light emitting area PXA-B1.

In the present disclosure, the protrusion width W may be equal to or greater than about 2 micrometers and equal to or smaller than about 5 micrometers. When the protrusion width W is smaller than about 2 micrometers, a viewing angle may not be sufficiently reduced. When the protrusion width W is greater than about 5 micrometers, the viewing angle may be reduced, and the non-light emitting area NPXA may be perceived by the user.

In the present embodiment, the second mode light emitting areas PXA-R2, PXA-G2, and PXA-B2 are reduced by the same width as a representative example, however, they should not be limited thereto or thereby. According to an embodiment, when the first mode is switched to the second mode, the second mode light emitting areas PXA-R2, PXA-G2, and PXA-B2 may have different protrusion widths W of the light blocking pattern BM from each other.

The light traveling to the second mode light emitting areas PXA-R2, PXA-G2, and PXA-B2 may be provided to the user within the viewing angle smaller than that of the light traveling to the first mode light emitting areas PXA-R1, PXA-G1, and PXA-B1.

According to the present disclosure, as the viewing angle increases or decreases as needed, a viewing angle of a third party viewed from the side surface of the display device may be blocked, and thus, a privacy protection function of the display device may be improved.

Figure 7A:
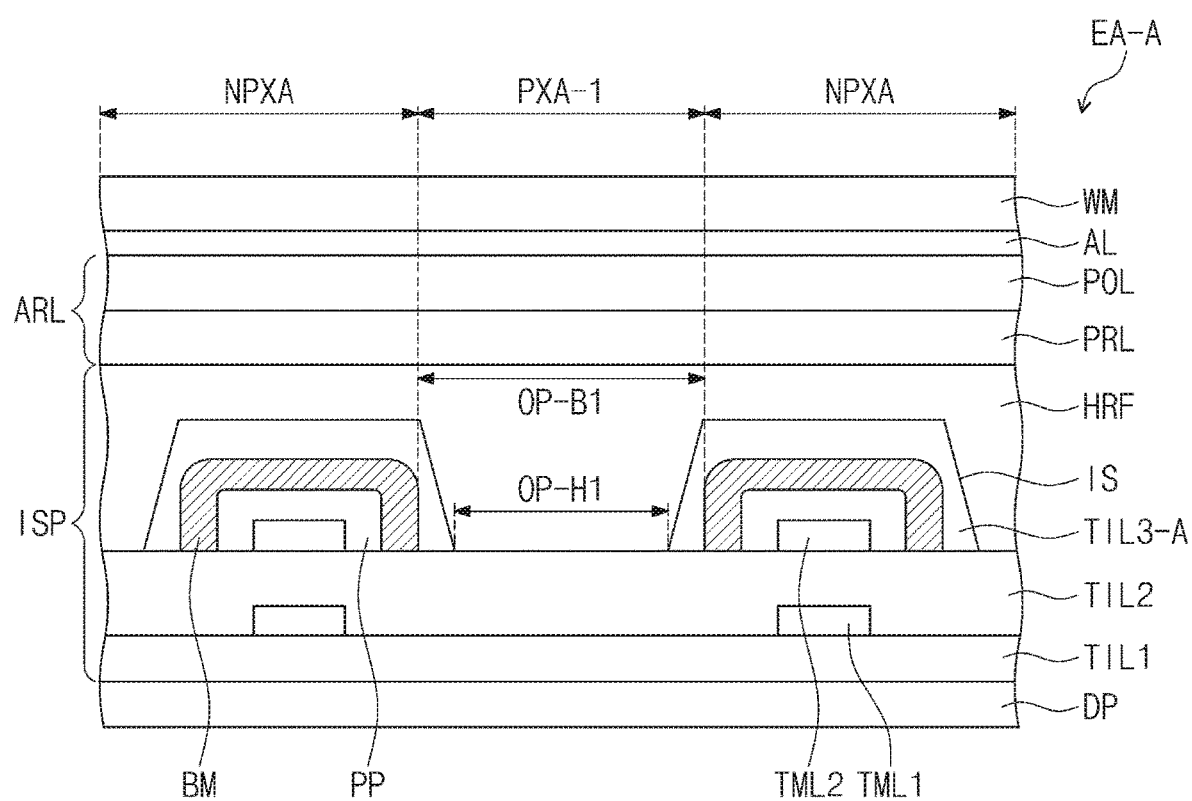
FIG. 7A is a cross-sectional view showing a display device in a first mode.
Figure 7B:
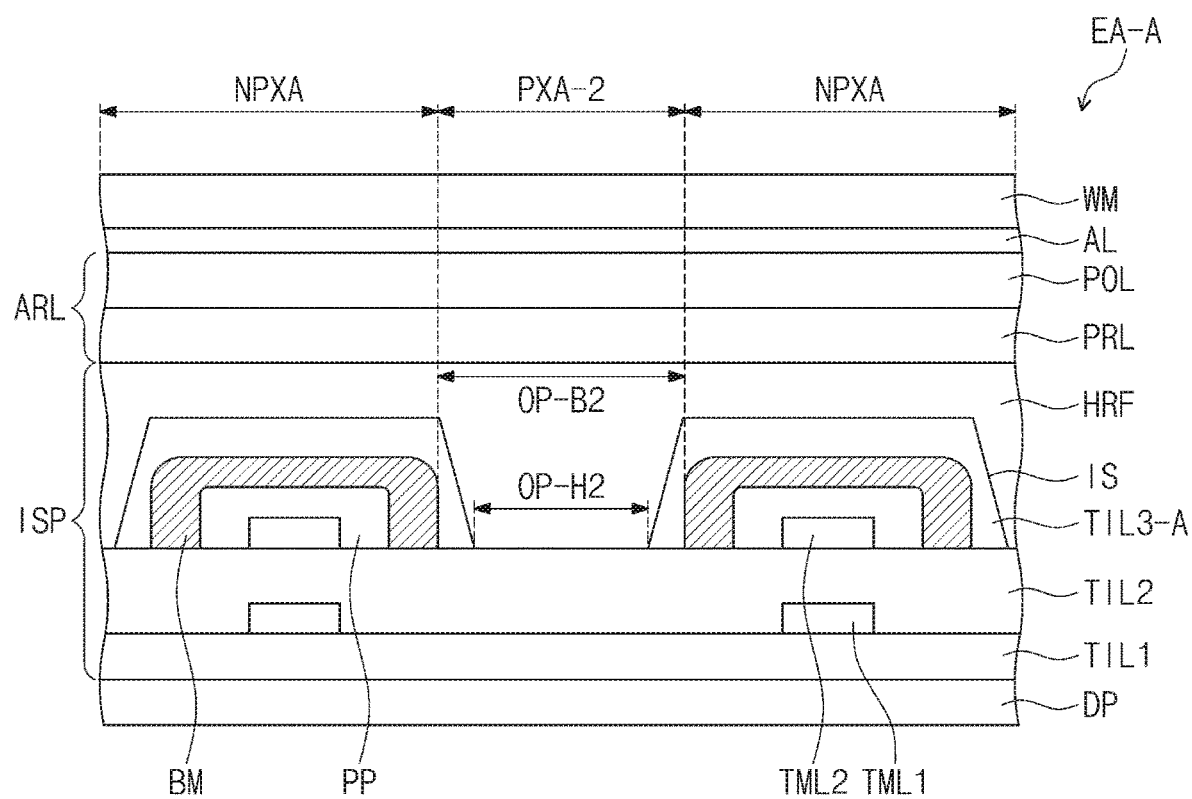
FIG. 7B is a cross-sectional view showing a display device in a second mode.

FIG. 7A is a cross-sectional view showing a display device EA-A in a first mode, and FIG. 7B is a cross-sectional view showing the display device EA-A in a second mode. In FIGS. 7A and 7B, the same reference numerals denote the same elements in FIGS. 1A, 1B, 2A, 2B, 3, 4A, 4B, 5A, 5B, 5C, 6A, and 6B, and thus, detailed descriptions of the same elements will be omitted.

Referring to FIG. 7A, the display device EA-A may include a display panel DP, an input sensing panel ISP, an anti-reflective member ARL, and a window member WM. The anti-reflective member ARL may include a polarizing layer POL and a retarder layer PRL. The display panel DP shown in FIGS. 7A and 7B may correspond to the display panel DP described with reference to FIG. 4B, and thus, details thereof will be omitted.

The input sensing panel ISP may be disposed on the display panel DP. The input sensing panel ISP may include sensing insulating layers TIL1, TIL2, and TILS-A, conductive patterns TML1 and TML2, and a cover layer HRF.

A first sensing insulating layer TIL1 may be disposed on the display panel DP, and first conductive patterns TML1 may be disposed on the first sensing insulating layer TIL1. A second sensing insulating layer TIL2 may be disposed on the first sensing insulating layer TIL1 and may cover the first conductive patterns TML1. Second conductive patterns TML2 may be disposed on the second sensing insulating layer TIL2.

A piezoelectric pattern PP may be disposed on the second sensing insulating layer TIL2 and may cover the entirety of the second conductive patterns TML2. That is, the upper surface and both sides of the second conductive patterns TML2 are covered by the piezoelectric pattern PP. A light blocking pattern BM may be disposed on the second sensing insulating layer TIL2 and may cover the entirety of the piezoelectric pattern PP. That is, the upper surface and both sides of the piezoelectric pattern PP is covered by the light blocking pattern BM.

A third sensing insulating layer TIL3-A may be disposed on the second sensing insulating layer TIL2 and may cover the light blocking pattern BM. In the present embodiment, the third sensing insulating layer TIL3-A may have a predetermined pattern.

As an example, the third sensing insulating layer TIL3-A may cover an upper surface and a side surface of the light blocking pattern BM in a cross-section and may expose the second sensing insulating layer TIL2 in an area overlapping a first light emitting area PXA-1 of the second sensing insulating layer TIL2.

According to the present embodiment, the third sensing insulating layer TIL3-A may have a trapezoidal shape in a cross-section. Accordingly, the third sensing insulating layer TIL3-A may include an inclined surface IS inclined from the second sensing insulating layer TIL2 to a direction from which the light is emitted from the display panel DP.

The inclined surface IS may have a straight line shape in the cross-section, however, it should not be limited thereto or thereby. According to an embodiment, the inclined surface IS may include a curved line in the cross-section and should not be particularly limited.

The third sensing insulating layer TIL3-A may define a first cover opening OP-H1. The first cover opening OP-H1 may have a width defined as a minimum width between inclined surfaces IS adjacent to each other.

As a volume of the light blocking pattern BM is changed when the first mode is changed to the second mode, a volume of the third sensing insulating layer TIL3-A may be substantially simultaneously changed with the light blocking pattern BM. Accordingly, the width of the first cover opening OP-H1 may be changed.

The cover layer HRF may be disposed on the second sensing insulating layer TIL2. The cover layer HRF may cover an upper surface and the inclined surface IS of the third sensing insulating layer TIL3-A. An area of the second sensing insulating layer TIL2, which overlaps the first cover opening OP-H1, may be in contact with the cover layer HRF. The cover layer HRF may provide a planarization layer.

The cover layer HRF may include a material having a relatively high refractive index compared with insulating layers disposed under the cover layer HRF. In the present embodiment, the refractive index of the cover layer HRF may be equal to or greater than about 1.6 and equal to or smaller than about 1.8.

The anti-reflective member ARL may be disposed on the input sensing panel ISP. The retarder layer PRL may be disposed on the cover layer HRF, and the polarizing layer POL may be disposed on the retarder layer PRL.

Although not shown in figures, the display device EA-A may further include supporters (not shown) which are respectively disposed on and under the polarizing layer POL. The supporters (not shown) may support the polarizing layer POL and may prevent external contaminants and impacts from being applied to the polarizing layer POL.

The retarder layer PRL may have an optically anisotropic property and may retard a component of a light incident thereto. The retarder layer PRL may change a polarization state of the light. As an example, the polarization state of the light may be changed to a circularly-polarized state from a linearly-polarized state or to the linearly-polarized state from the circularly-polarized state while passing through the retarder layer PRL.

The retarder layer PRL may include at least one of a polycarbonate-based resin, a cyclic olefin-based resin, an acrylic-based resin, and a cellulose-based resin, however, the material for the retarder layer PRL should not be limited thereto or thereby. According to an embodiment, the retarder layer PRL may include a liquid crystal.

Although not shown in figures, the polarizing layer POL may have a transmission axis (not shown) and an absorption axis (not shown) intersecting the transmission axis. In the present embodiment, the transmission axis (not shown) and the absorption axis (not shown) may be substantially perpendicular to each other.

Accordingly, a component of an external light incident into the polarizing layer POL may be absorbed by the absorption axis (not shown) or may be reflected, and thus, may not pass through the polarizing layer POL. Among components of the external light, a component that is perpendicular to the component of the external light may pass through the polarizing layer POL. That is, the polarizing layer POL may linearly polarize the external light.

The polarizing layer POL may include a polymer resin stretched in a certain direction, however, it should not be limited thereto or thereby. The polarizing layer POL may be a wire grid polarizer.

Consequently, the external light incident into the polarizing layer POL may be incident into the retarder layer PRL after being linearly polarized and may be circularly polarized while passing through the retarder layer PRL. The circularly-polarized external light may be reflected by the display module DM (refer to FIG. 2A), and a polarization direction of the external light may be changed.

The reflected light whose polarization direction is changed may be incident into the retarder layer PRL again, and a phase of a component of the reflected light may be retarded by the retarder layer PRL. Accordingly, the polarization state of the reflected light may be changed to the linearly-polarized state from the circularly-polarized state. The linearly-polarized direction of the reflected light may be substantially parallel to the absorption axis of the polarizing layer POL, and the linearly-polarized reflected light may be absorbed by the polarizing layer POL.

Accordingly, the anti-reflective member ARL may prevent the external light incident into the display device EA-A from the outside from being perceived by the user after being reflected by the display module DM (refer to FIG. 2A).

The window member WM may be disposed on the anti-reflective layer ARL. The window member WM and the anti-reflective member ARL may be attached to each other by an adhesive layer AL. However, the adhesive layer AL may be omitted.

In FIG. 7B, components of the display device EA-A that are changed according to the variation in volume of the piezoelectric pattern PP and the light blocking pattern BM in the second mode will be described in detail, and detailed descriptions on components of the display device EA-A that are not changed when compared with those in FIG. 7A will be omitted.

According to the present disclosure, as the volume of the light blocking pattern BM increases overall when the first mode is changed to the second mode, the volume of the third sensing insulating layer TIL3-A may increase overall. Accordingly, a width of a second cover opening OP-H2 may be smaller than the width of the first cover opening OP-H1.

In the present disclosure, a size of the second light emitting area PXA-2 may be smaller than a size of the first light emitting area PXA-1. Accordingly, a light traveling to the second light emitting area PXA-2 may pass through a light emitting area narrower than that through which a light traveling to the first light emitting area PXA-1 passes, and thus, the light may be provided to the user with a relatively narrow viewing angle in the second mode.

According to the present disclosure, as the viewing angle increases or decreases as needed, a viewing angle of the third party viewed from the side surface of the display device may be blocked, and thus, the privacy protection function of the display device may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present disclosure shall be determined according to the attached claims.

What is claimed is:

1. A display device comprising:
   a display panel including a pixel providing a light; and
   an input sensing panel configured to sense an external input, the input sensing panel including:
   a first sensing insulating layer disposed on the display panel;
   a plurality of first conductive patterns disposed on the first sensing insulating layer;
   a second sensing insulating layer disposed on the first sensing insulating layer to cover the first conductive patterns;
   a plurality of second conductive patterns disposed on the second sensing insulating layer;
   a piezoelectric pattern covering the second conductive patterns;
   a light blocking pattern covering the piezoelectric pattern and defining a transmission opening configured to transmit light; and
   a third sensing insulating layer disposed on the second sensing insulating layer to cover the light blocking pattern,
   wherein the piezoelectric pattern is in direct contact with the second conductive patterns, and
   a first voltage is applied to the second conductive patterns in a first mode, and a second voltage different from the first voltage is applied to the second conductive patterns in a second mode.

2. The display device of claim 1, wherein the transmission opening has a first width in one direction in the first mode and has a second width smaller than the first width in the one direction in the second mode.

3. The display device of claim 2, wherein the display panel includes:
   a base layer;
   a circuit element layer including a transistor disposed on the base layer;
   a display element layer including a first electrode connected to the transistor, a second electrode disposed on the first electrode, a light emitting layer disposed between the first electrode and the second electrode, and a pixel definition layer through which a display opening is defined to expose at least a portion of the first electrode; and
   an encapsulation layer covering the display element layer, and the first sensing insulating layer is disposed on the encapsulation layer and in direct with the encapsulation layer.

4. The display device of claim 3, wherein the piezoelectric pattern has larger volume in the second mode than in the first mode.

5. The display device of claim 3, wherein the light blocking pattern includes a side surface defining a boundary of a light emitting area, and
   wherein the light emitting area has smaller size in the second mode than in the first mode.

6. The display device of claim 5, wherein the light blocking pattern is protruded to a direction toward the light emitting area when the first mode is changed to the second mode, and a width of the protruded portion of the light blocking pattern is within a range equal to or greater than about 2 micrometers and equal to or smaller than about 5 micrometers when the first mode is changed to the second mode.

7. The display device of claim 1, wherein the light blocking pattern includes a light absorbing material.

8. The display device of claim 5, further including:
   a color filter layer disposed on the input sensing panel and overlapping the light emitting area; and
   a window disposed on the color filter layer.

9. The display device of claim 5, wherein the input sensing panel further includes a cover layer disposed on the third sensing insulating layer, the third sensing insulating layer defines a cover opening exposing at least a portion of the second sensing insulating layer and overlapping at least a portion of the light emitting area, and the cover layer is in contact with the second sensing insulating layer in an area overlapping the cover opening.

10. The display device of claim 1, wherein the second conductive patterns includes a plurality of mesh lines.

11. A display device including:
    a display panel including a pixel providing a light; and
    an input sensing panel sensing an external input, the input sensing panel including:
    a plurality of sensing insulating layers;

a plurality of conductive patterns disposed between the sensing insulating layers;

a piezoelectric pattern covering at least a portion of the conductive patterns; and a light blocking pattern covering the piezoelectric pattern and defining a transmission opening transmitting the light, wherein the piezoelectric pattern is in direct contact with the conductive patterns, a first voltage is applied to the conductive patterns in a first mode, and a second voltage different from the first voltage is applied to the conductive patterns in a second mode, and the transmission opening has a first width in one direction in the first mode and has a second width smaller than the first width in the one direction in the second mode.

12. The display device of claim 11, wherein the display panel includes:

a base layer;

a circuit element layer including a transistor disposed on the base layer;

a display element layer including a first electrode connected to the transistor, a second electrode disposed on the first electrode, a light emitting layer disposed between the first electrode and the second electrode, and a pixel definition layer through which a display opening is defined to expose at least a portion of the first electrode; and an encapsulation layer covering the display element layer, and a sensing insulating layer disposed nearest to the display panel among the sensing insulating layers is disposed on the encapsulation layer and in direct contact with the encapsulation layer.

13. The display device of claim 12, wherein the piezoelectric pattern has larger volume in the second mode than in the first mode.

14. The display device of claim 13, wherein the light blocking pattern includes a side surface defining a boundary of a light emitting area, and wherein the light emitting area has smaller size in the second mode than in the first mode.

15. The display device of claim 14, wherein the light blocking pattern is protruded to a direction toward the light emitting area when the first mode is changed to the second mode, and a width of the protruded portion of the light blocking pattern is within a range equal to or greater than about 2 micrometers and equal to or smaller than about 5 micrometers when the first mode is changed to the second mode.

16. The display device of claim 14, further including:

a color filter layer disposed on the input sensing panel and overlapping the light emitting area; and a window disposed on the color filter layer.

17. The display device of claim 14, wherein the input sensing panel further includes a cover layer covering at least a portion of the sensing insulating layers, and a sensing insulating layer disposed at an uppermost position among the sensing insulating layers has a trapezoidal shape in a cross-section and defines a cover opening overlapping at least a portion of the light emitting area.

18. An input sensing panel including:

a first sensing insulating layer;

a plurality of first conductive patterns disposed on the first sensing insulating layer;

a second sensing insulating layer disposed on the first sensing insulating layer to cover the first conductive patterns;

a plurality of second conductive patterns disposed on the second sensing insulating layer;

a piezoelectric pattern covering the second conductive patterns;

a light blocking pattern covering the piezoelectric pattern and defining a transmission opening through which at least a portion of the second sensing insulating layer is exposed; and a third sensing insulating layer disposed on the second sensing insulating layer to cover the light blocking pattern, wherein the piezoelectric pattern is in direct contact with the second conductive patterns, and a first voltage is applied to the second conductive patterns in a first mode, and a second voltage different from the first voltage is applied to the second conductive patterns in a second mode.

19. The input sensing panel of claim 18, wherein the transmission opening has a first width in one direction in the first mode and has a second width smaller than the first width in the one direction in the second mode.

20. The input sensing panel of claim 19, wherein the piezoelectric pattern has a changeable volume that is changed when the first mode is changed to the second mode.

* * * * *